United States Patent
Sakai et al.

(10) Patent No.: US 7,194,144 B1
(45) Date of Patent: Mar. 20, 2007

(54) DOCUMENT IMAGE PROCESSING DEVICE, DOCUMENT IMAGE MERGING METHOD, AND STORAGE MEDIUM RECORDING A DOCUMENT IMAGE MERGING PROGRAM

(75) Inventors: Kenichiro Sakai, Kanagawa (JP); Hirotaka Chiba, Kanagawa (JP); Tsugio Noda, Kanagawa (JP); Hiroyuki Takakura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/475,991

(22) Filed: Dec. 30, 1999

(30) Foreign Application Priority Data

Jan. 18, 1999 (JP) .......................................... 11-009381
Apr. 20, 1999 (JP) .......................................... 11-111708

(51) Int. Cl.
G06K 9/36 (2006.01)
G06K 9/32 (2006.01)

(52) U.S. Cl. ....................................... 382/284; 382/294
(58) Field of Classification Search ................. 382/284, 382/294, 313, 318, 190, 195; 358/450, 473; 345/634, 636

See application file for complete search history.

(56) References Cited

U.S. PATENT DOCUMENTS

| | | | | |
|---|---|---|---|---|
| 4,272,756 A | * | 6/1981 | Kakumoto et al. | 382/284 |
| 4,949,391 A | * | 8/1990 | Faulkerson et al. | 382/313 |
| 5,675,672 A | * | 10/1997 | Nakabayashi | 382/318 |
| 2002/0001418 A1 | * | 1/2002 | Fahraeus et al. | 382/311 |

FOREIGN PATENT DOCUMENTS

| | | | |
|---|---|---|---|
| JP | 1-229559 | | 9/1989 |
| JP | 3-188575 | | 8/1991 |
| JP | 11066234 A | * | 3/1999 |
| JP | 11196255 A | * | 7/1999 |

* cited by examiner

Primary Examiner—Jing ge Wu
Assistant Examiner—Brian Le
(74) Attorney, Agent, or Firm—Armstrong, Kratz, Quintos, Hanson & Brooks, LLP

(57) ABSTRACT

A character region detecting unit detects respective character regions in a plurality of document images which are partitioned and read. A character recognizing unit recognizes the characters within the detected character regions, and converts them into character codes. An overlapping position detecting unit detects the positions of line images whose matching degrees are high as an overlapping position by making a comparison between the positions and the sizes of the character regions in the two document images. An image merging unit merges the two document images at the detected overlapping position.

22 Claims, 34 Drawing Sheets

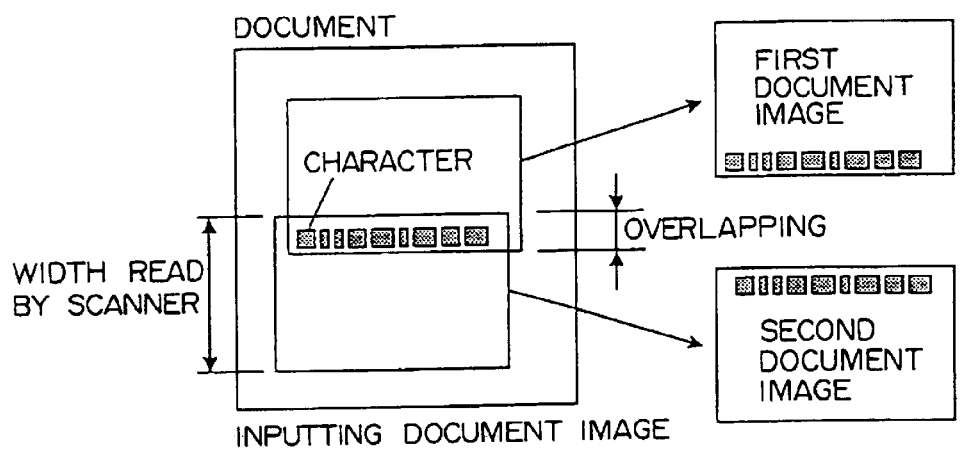
FIG. 3A  INPUTTING DOCUMENT IMAGE
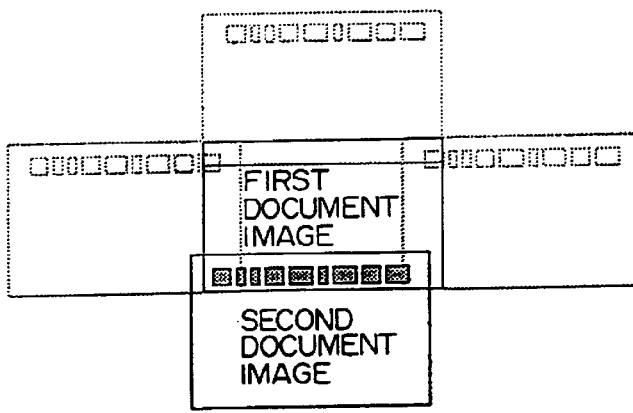
FIG. 3B  DETECTING OVERLAPPING POSITION
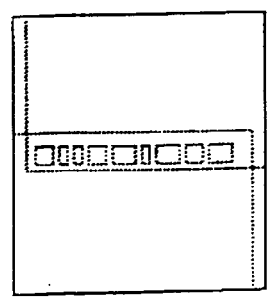
FIG. 3C  MERGING IMAGE

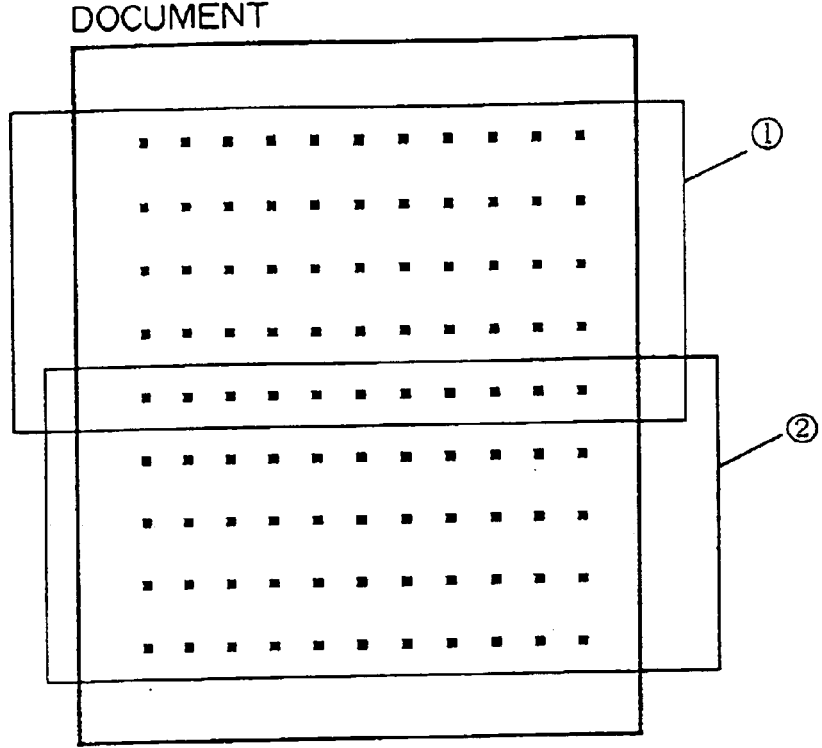
FIG. 8A — HORIZONTALLY WRITTEN DOCUMENT
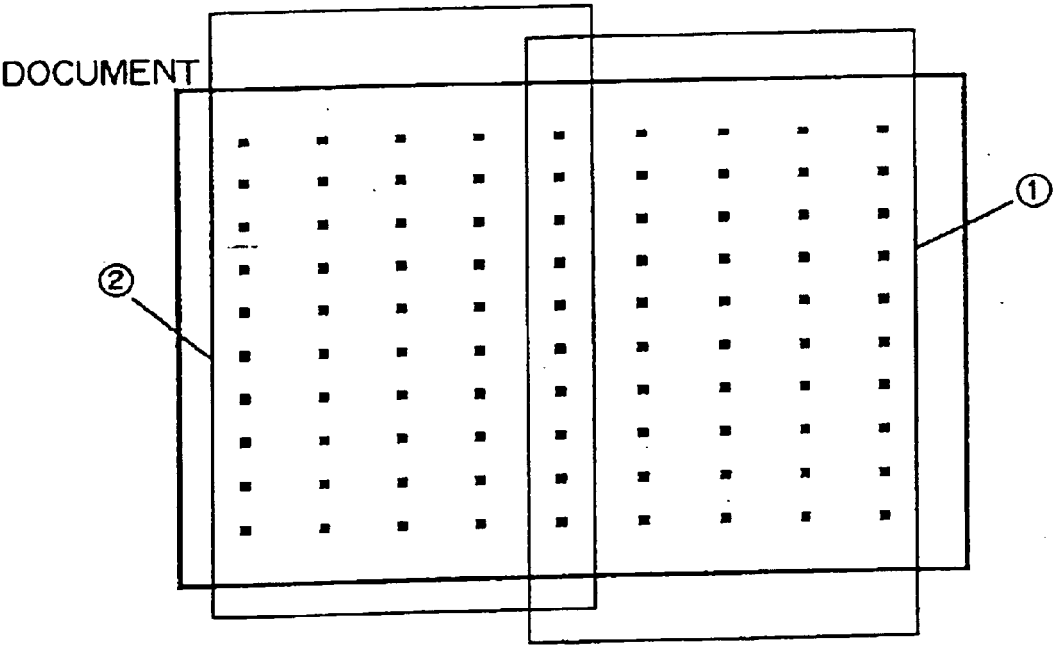
FIG. 8B — VERTICALLY WRITTEN DOCUMENT

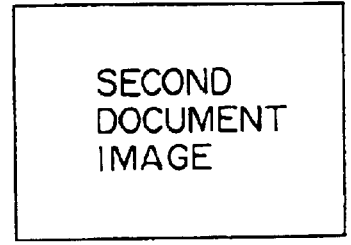
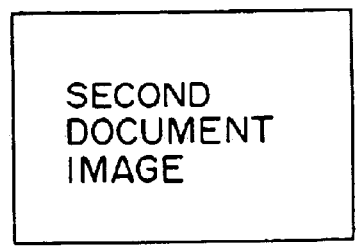
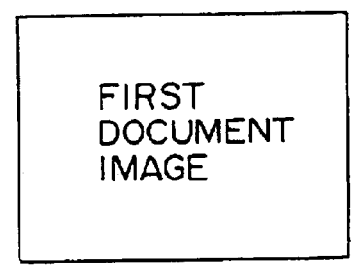
FIG. 9A
FIG. 9B
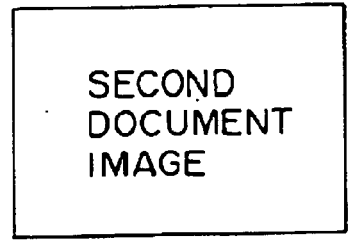
FIG. 9C
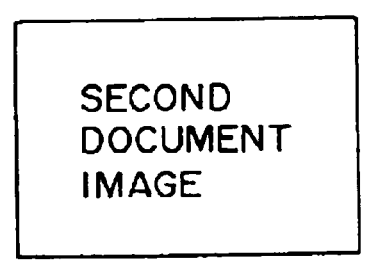
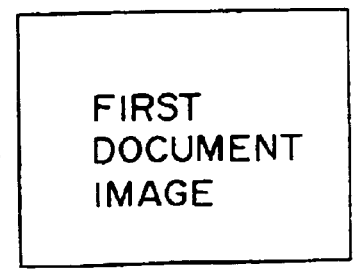
FIG. 9D

WHEN HORIZONTALLY WRITTEN DOCUMENT IS SCANNED IN VERTICAL DIRECTION

WHEN VERTICALLY WRITTEN DOCUMENT IS SCANNED IN HORIZONTAL DIRECTION

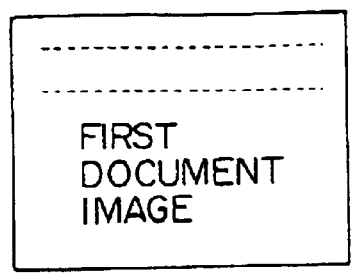
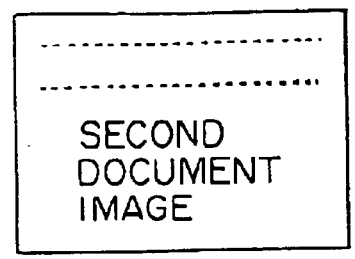
FIG. 12A  FIG. 12B
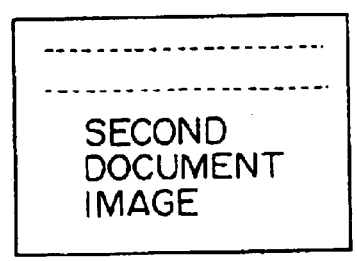
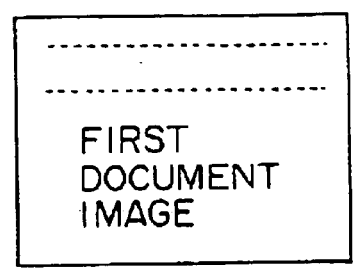
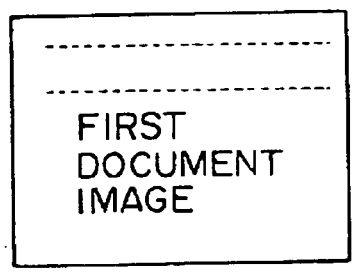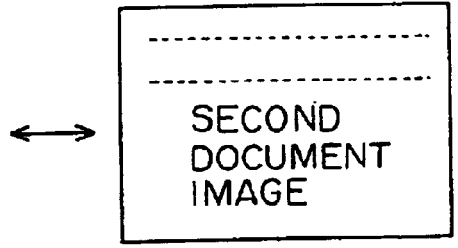
FIG. 12C
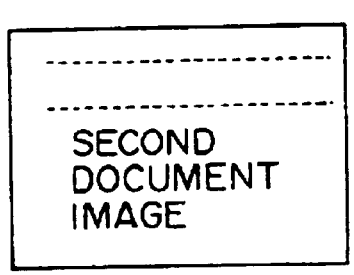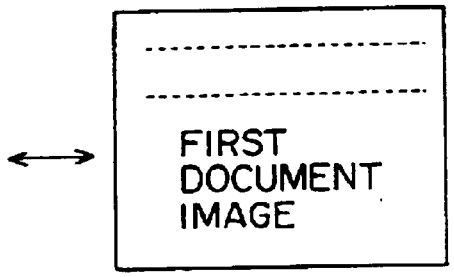
FIG. 12D

EXTRACTING BLACK PIXEL LINES

DETERMINED ACCORDING TO RATIO OF BLACK PIXELS TO WHITE PIXELS

EXTRACTING WHITE PIXEL LINES

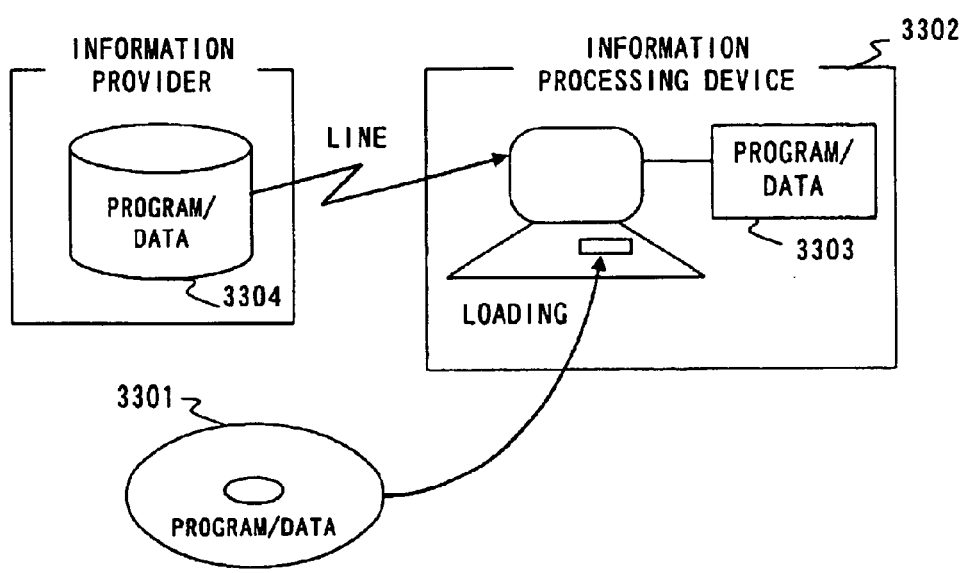
F I G. 33

DOCUMENT IMAGE PROCESSING DEVICE, DOCUMENT IMAGE MERGING METHOD, AND STORAGE MEDIUM RECORDING A DOCUMENT IMAGE MERGING PROGRAM

BACKGROUND OF THE INVENTION

1. Field of the Invention

The present invention relates to a document image processing device for regenerating a document image by merging a plurality of document images read by scanners, etc., a document image merging method, and a storage medium recording a program for merging document images.

2. Description of the Related Art

There is a demand for reading an image of a large size in a newspaper, a design drawing, etc. In such a case, it is possible to use an image reading device having a scanner which can directly read an image of a large size such as an A1 size, etc. However, a large-sized image reading device not only costs high, but also requires wide installation space.

Therefore, a method with which an image of, for example, a size larger than A4 is partitioned and read by using an A4-sized scanner, and an operator manually merges the partitioned images while viewing them on a screen, or a method with which alignment marks are put on a manuscript or a transparent sheet to cover a manuscript, and a plurality of partitioned and read images are merged by using the alignment marks is proposed.

For example, the Japanese Laid-open Patent Publication (TOKKAIHEI) No. 1-229559 recites a technique with which marks instructing to partition a manuscript larger than a maximum allowable size which can be read by a single read operation into regions smaller than the maximum allowable size, are put on a manuscript beforehand, the image is partitioned into a plurality of regions so that the regions include the partition instruction marks, and the partitioned images are merged into one image based on the positional information of the partition instruction marks.

FIG. 34 explains a conventional method for partitioning and reading an image on which marks are put beforehand, and for merging the read images into the original image.

In this example, marks for merging partitioned images are put on an image to be input beforehand, a first image being the left side of the image to be input is read to include the marks during first scanning, and a second image being the right side of the image is read to include the marks during second scanning in a similar manner. Then, the positions of the marks of the first and the second images are detected, and the two images are merged so that the positions of the marks are aligned. As a result, the original image can be restored.

Recently, a small-sized hand-held scanner, which is handy to carry and is available to a notebook computer, has been developed and put into a product with the popularization of a portable notebook computer. Since a hand-held scanner of this type adopts a small-sized photoelectric conversion sensor in order to reduce the size of its main body, the width that can be scanned at one time is narrow. Accordingly, it is necessary to dividedly scan, for example, even an A4-sized manuscript a plural number of times, and to merge the read images.

However, there is a problem in that the operations of the method with which an operator manually merges images which are read by a scanner are bothersome. Additionally, since marks must be put on an image to be input whenever reading an image with the method putting marks on an image to be input, this method is difficult to use.

SUMMARY OF THE INVENTION

An object of the present invention is to allow document images which are partitioned and read to be automatically merged.

A document image processing device in a first aspect of the present invention comprises: a character region extracting unit for extracting character regions respectively from a plurality of document images which are partitioned and read; a character recognizing unit for recognizing character images within the character regions extracted by the character region extracting unit; an overlapping detecting unit for detecting an overlapping of the plurality of document images based on the character recognition results of the respective document images, which are obtained by the character recognizing unit; and an image merging unit for merging the plurality of document images at the overlapping position detected by the overlapping detecting unit.

According to the present invention, a plurality of documents can be automatically merged without performing any particular operation for merging the plurality of document images which are partitioned and read by a user, or without putting merging marks on the document images.

A document image processing device in a second aspect of the present invention comprises: a character region extracting unit for extracting character regions respectively from a plurality of document images which are partitioned and read; an overlapping detecting unit for detecting a plurality of character regions whose matching degrees are high by making the comparison between the positions and the sizes of the character regions in the document images, which are extracted by the character region extracting unit, and for detecting an overlapping of the document images based on the detected character regions whose matching degrees are high; and an image merging unit for merging the plurality of document images at the overlapping position detected by the overlapping detecting unit.

According to the present invention, one document image can be regenerated by merging partitioned document images without performing any particular operation for merging the document images which are partitioned and read.

For example, the character recognizing unit recognizes the character images within extracted character regions, and converts the recognized character images into character codes, and the overlapping detecting unit detects the position at which document images overlap by making a comparison between a plurality of character codes of the respective document images.

Additionally, the character region extracting unit may extract character regions in line image units of partitioned document images, and the overlapping detecting unit may detect an overlapping position by making a comparison between the character regions in the respective line images.

Furthermore, the position at which document images overlap may be detected by making a comparison between character regions in directions from the borders of the document images toward their centers when a document image is partitioned into two images, and the partitioned images are compared in line image units.

In this case, an overlapping position can be detected in a short time by making a comparison between line images sequentially from the margins with a high probability where two document images match.

Additionally, the overlapping detecting unit may regard a character region within a particular region of a document image as being a detection target of an overlapping position.

When a document is partitioned into two images including an overlapping portion, an overlapping region to be read is limited to a certain extent. Therefore, an overlapping position can be efficiently detected by making a comparison between character regions within particular regions.

Furthermore, the overlapping detecting unit may detect an overlapping position sequentially from in a direction with a higher priority among a plurality of detection directions such as a direction from the bottom of a document toward its center a direction from the top of the document toward the center, a direction from the left toward the center, a direction from the right toward the center, etc.

By way example, when a horizontally written document is partitioned into two images and read, it is frequently the case where the top of the document is firstly read, and the bottom is secondly read. Therefore, a top priority is assigned to the direction from the bottom of the firstly read document toward its center, or to the direction from the top of the secondly read document image toward its center, so that an overlapping position can be efficiently detected by making the comparison between the sizes and the positions of the character regions in the two document images, or their character codes initially in the direction with the top priority.

A document image processing device in a third aspect of the present invention comprises: a region partitioning unit for respectively partitioning an arbitrary number of document images among a plurality of document images which are partitioned and read, or the respective document images into a plurality of regions; a line image extracting unit for extracting line images respectively from the plurality of regions partitioned by the region partitioning unit; an overlapping detecting unit for detecting a position at which the plurality of document images overlap based on the positions of the character regions whose matching degrees are high by making a comparison between the character regions in the line images in the regions extracted by the line image extracting unit; and an image merging unit for merging the plurality of documents at the overlapping position detected by the overlapping detecting unit.

According to the present invention, even if a document image includes a table, a graphic, etc., a line image which does not include a graphic, etc. can be extracted by partitioning the document image into a plurality of regions and by extracting the line images respectively from the regions. Accordingly, the position at which the document images overlap can be accurately detected by making a comparison between the character regions in the line images.

A document image processing device in a fourth aspect of the present invention comprises: a region partitioning unit for respectively partitioning an arbitrary number of document images among a plurality of document images which are partitioned and read, or the respective document images into a plurality of regions; a line image extracting unit for extracting line images respectively from the regions partitioned by the region partitioning unit; an overlapping detecting unit for detecting a position at which a plurality of document images overlap based on the positions of the character regions whose matching degrees are high by making a comparison between the character regions in the line images in the respective regions extracted by the line image extracting unit; an image merging unit for merging the plurality of document images at the overlapping position detected by the overlapping detecting unit; and a setting unit for allowing the setting of whether or not to automatically merge the plurality of document images on a display screen.

According to the present invention, a user can easily set whether or not to automatically merge document images with the setting unit displayed on a display screen. For instance, a button is displayed on a display screen, and the enabling/disabling of the execution of automatic merging is allowed to be specified with the button, so that an operation for setting whether or not to automatically merge images can be simplified.

Furthermore, since the resolution of a scanner to be used, the number of merged sheets of document images, the paper size of a document image to be read, etc. can be set on a screen, condition setting for merging document images can be easily made.

BRIEF DESCRIPTION OF THE DRAWINGS

FIGS. 3A, 3B, and 3C explain the principle of the present invention;

FIGS. 8A and 8B respectively explain the scanning orders of horizontally and vertically written documents;

FIGS. 9A through 9D explain the detection directions of overlapping positions;

FIGS. 12A through 12D explain the merging directions of horizontally written documents;

FIG. 33 explains storage media; and

DESCRIPTION OF THE PREFERRED EMBODIMENTS

Figure 1:
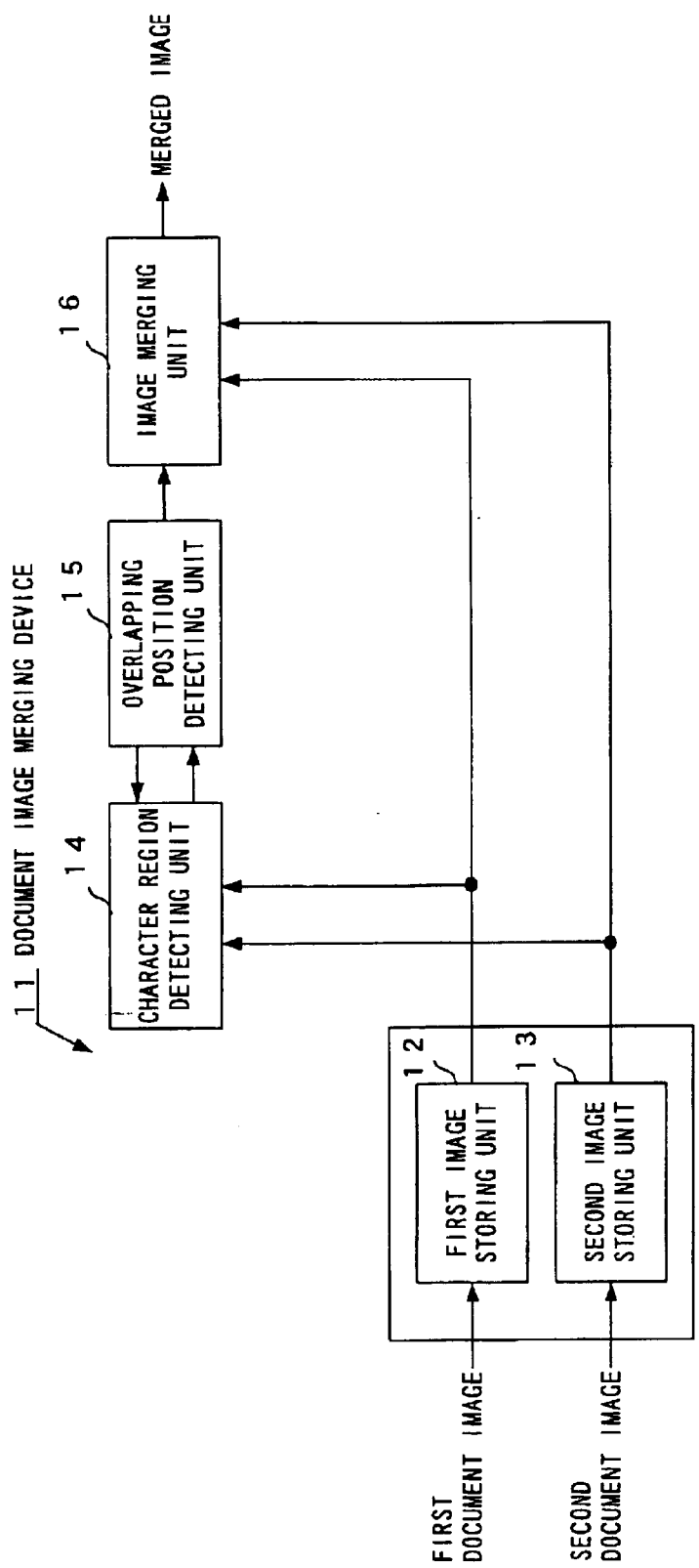
FIG. 1 is a block diagram showing the configuration of a document image processing device according to a first preferred embodiment of the present invention.

Preferred embodiments according to the present invention are hereinafter explained by referring to the drawings. FIG. 1 is a block diagram showing the configuration of a document image processing device 11 (for example, implemented by a personal computer) according to a first preferred embodiment of the present invention. The document image processing device according to the first preferred embodiment is intended to extract character regions in two document images, and to detect a position at which the two documents overlap by making the comparison between the sizes and the positions of the character regions. An image inputting unit is implemented, for example, by a hand-held scanner, etc. A document image merging system is composed of, for example, a personal computer having a document image merging capability and a hand-held scanner.

Document images read by a hand-held scanner, etc. are stored in a first and a second image storing unit 12 and 13 after noise on the images, etc. are removed, and then, a preprocess for correcting an inclination, etc. is performed depending on need. Here, the firstly read document image is stored in the first image storing unit 12 as a first document image, while the secondly read document image is stored in the second image storing unit 13 as a second image.

A character region detecting unit 14 notifies an overlapping position detecting unit 15 of the sizes (the numbers of horizontal pixels and vertical pixels) of the first and the second document images read by the scanner. Then, the character region detecting unit 14 extracts one line image from the regions instructed by the overlapping position detecting unit 15, obtains the sizes and the coordinates of the character regions in the line images, for example, the coordinates at the upper left corner of the respective character regions on an orthogonal coordinate system where the upper left corner of each of the document images is defined to be an origin, and notifies the overlapping position detecting unit 15 of the obtained sizes and coordinates. Note that a character region indicates an area enclosed by a tetragon circumscribed to a character.

The overlapping position detecting unit 15 makes the comparison between the sizes and the positions of the character regions in the first and the second document images, determines the positions of the line images whose matching degrees between the sizes and the positions are high to be an overlapping position, and outputs, for example, the coordinates of the first and the last character regions in the matching line images to the image merging unit 16 as overlapping position coordinates.

The image merging unit 16 regenerates the original document image by merging the two document images based on the overlapping position coordinates output from the overlapping position detecting unit 15.

According to the first preferred embodiment, the position at which two document images overlap is detected by making the comparison between the positions and the sizes of character regions in the line images in the two document images, so that the document images can be merged at the detected position. Accordingly, a plurality of document images which are partitioned and read can be merged without performing any user operation for merging the document images.

Figure 2:
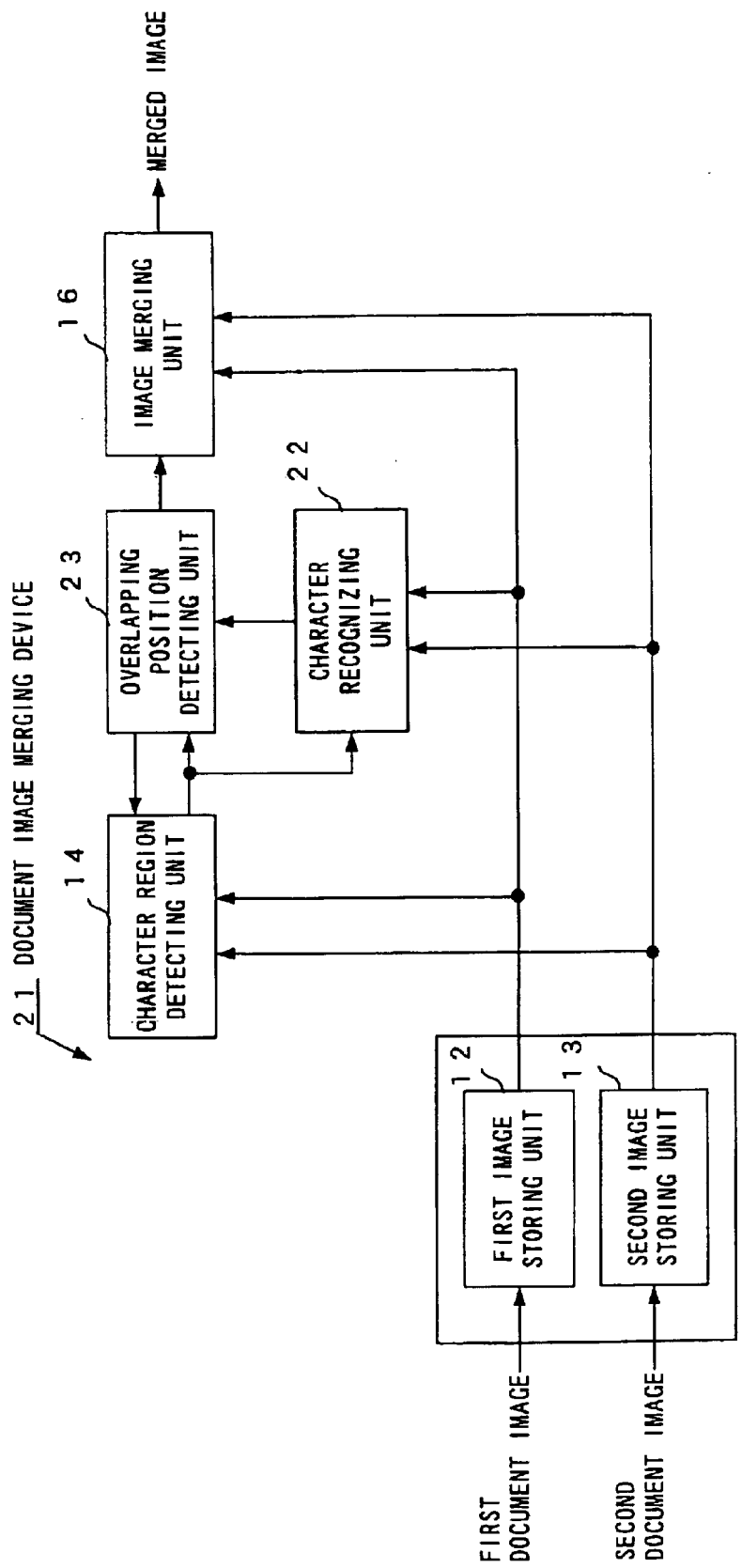
FIG. 2 is a block diagram showing the configuration of a document image processing device according to a second preferred embodiment of the present invention.

FIG. 2 is a block diagram showing the configuration of a document image processing device 21 according to a second preferred embodiment of the present invention. According to the second preferred embodiment, corresponding character codes are respectively obtained after characters within character regions in two respective document images, which are partitioned and read, are recognized, and an overlapping position is detected by making the comparisons between the character codes of the two document images, and between the positions and the sizes of the character regions.

In FIG. 2, the capabilities of a first image storing unit 12, a second image storing unit 13, and a character region detecting unit 14 are the same as those of the units shown in FIG. 1.

A character recognizing unit 22 obtains a corresponding character code after recognizing a character image in a character region detected by the character region detecting unit 14, and outputs the obtained code to an overlapping position detecting unit 23.

The overlapping position detecting unit 23 makes the comparison between the positions, the character codes and the sizes of the character regions in the line images within the first and the second document images, determines the positions of the line images whose matching degrees are high to be an overlapping position, and outputs the positional coordinates of the line images to an image merging unit 16. The image merging unit 16 merges the two document images based on the positional coordinates.

FIGS. 3A through 3C explain the principle of the present invention. First of all, as shown in FIG. 3A, one document image is partitioned into two images and read. In the example shown in FIG. 3A, the document images are read so that some of the characters in the document images overlap. Next, the character region detecting unit 14 detects the character regions in the first and the second document images, and outputs the coordinates and the sizes of the character regions to the overlapping position detecting unit 15. Or, the character recognizing unit 22 outputs corresponding character codes to the overlapping position detecting unit 23 after recognizing the characters within the character regions.

The overlapping position detecting unit 15 (or 23) makes the comparison between the coordinates and the sizes of the character regions in line image units in the two document images, and determines the line images whose matching degrees are high to be an overlapping position as shown in FIG. 3B. Or, the overlapping position detecting unit 15 (or 23) determines the line images whose matching degrees are high to be an overlapping position as a result of the comparison between the character codes of the line images in the two document images. After the overlapping position is detected, the document merging unit 16 regenerates the original document image by merging the two document images at the overlapping position.

Explained next is the process for detecting an overlapping position by making the comparisons between the coordinates and the sizes of character regions and between character codes, which is performed in the second preferred embodiment, by referring to FIGS. 4, 6, 10, and 13.

Figure 4:
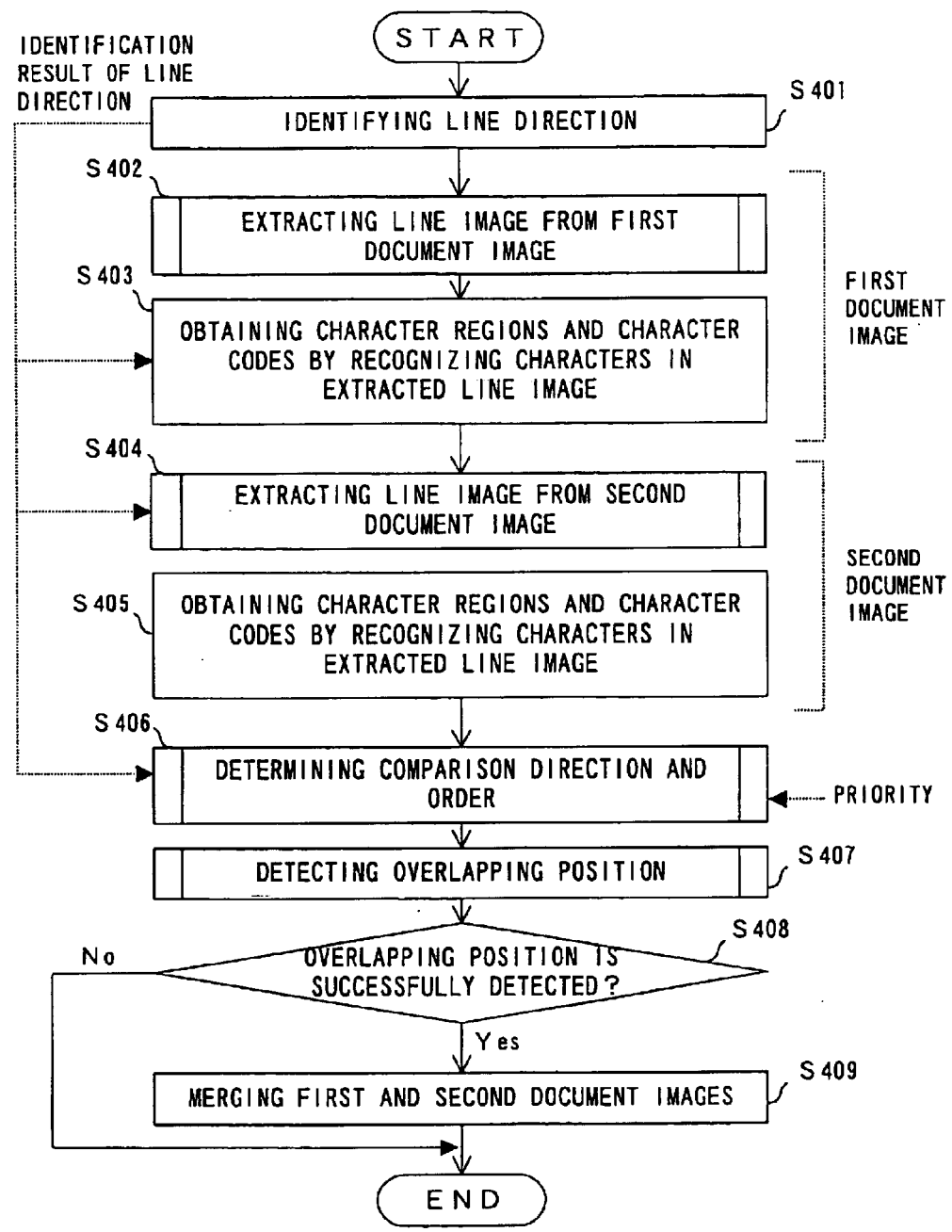
FIG. 4 is a flowchart showing an entire process.

FIG. 4 is a flowchart showing the entire process for merging document images. Initially, a line direction in a document image is identified (step S401 of FIG. 4). The line direction in a document image is identified, for example, by obtaining the accumulation values of the numbers of black pixels in a horizontal and a vertical direction for each pixel line in an image input by a scanner, and by judging from the distribution of the accumulation values of the numbers of black pixels. As an identification method, the variance of the accumulation value of the number of black pixels (the total number of black pixels included in one pixel line) is calculated in a scanning direction and in the direction vertical thereto, and the direction with larger variance is determined to be the line direction. If the number of black pixels is accumulated in a direction parallel to the lines, the accumulation value of black pixels becomes "0" in line space where no character exists. In this case, the number of black pixels becomes large in a line where characters exist. Therefore, the distribution of the accumulation value of black pixels significantly fluctuates either in a line or in a line space. In the meantime, if the number of black pixels is accumulated in a direction orthogonal to a line, the distribution of the accumulation value of black pixels does not significantly change. This is because a portion where character exist and a portion where no character exists coexist in each pixel line. In this way, the line direction against the scanning direction is identified. Note that the method for identifying a line direction against a scanning direction is not limited to the above described method. It may be a different method.

Figure 5:
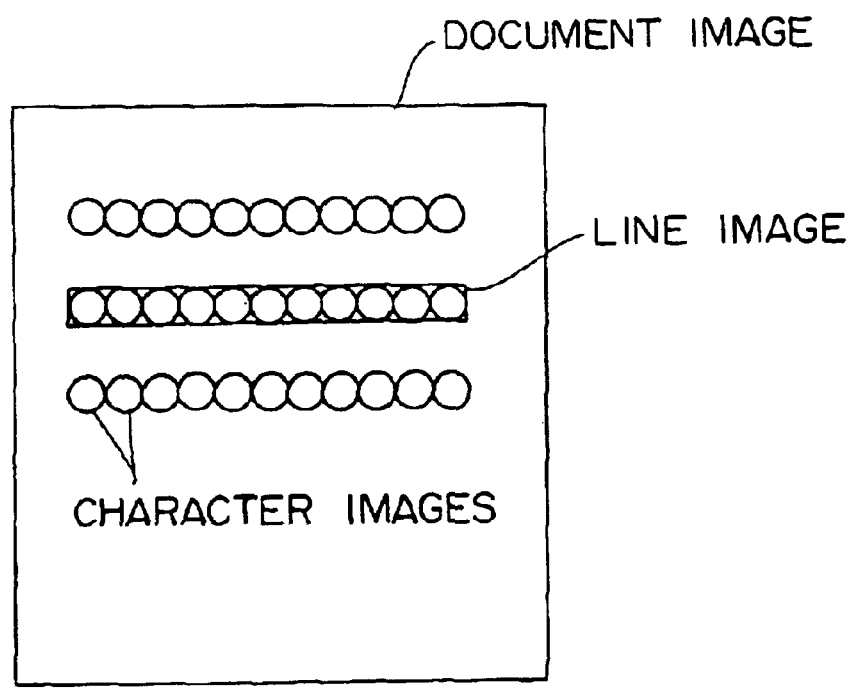
FIG. 5 explains line images.

Next, a line image is extracted from the first document image (step S402). Here, the line image indicates an image within a region circumscribed to a plurality of character images forming one line in a document image as shown in FIG. 5.

Explained next is the process for extracting lines image, which is performed in steps S402 and 404 of FIG. 4, by referring to the flowchart shown in FIG. 6.

Figure 6:
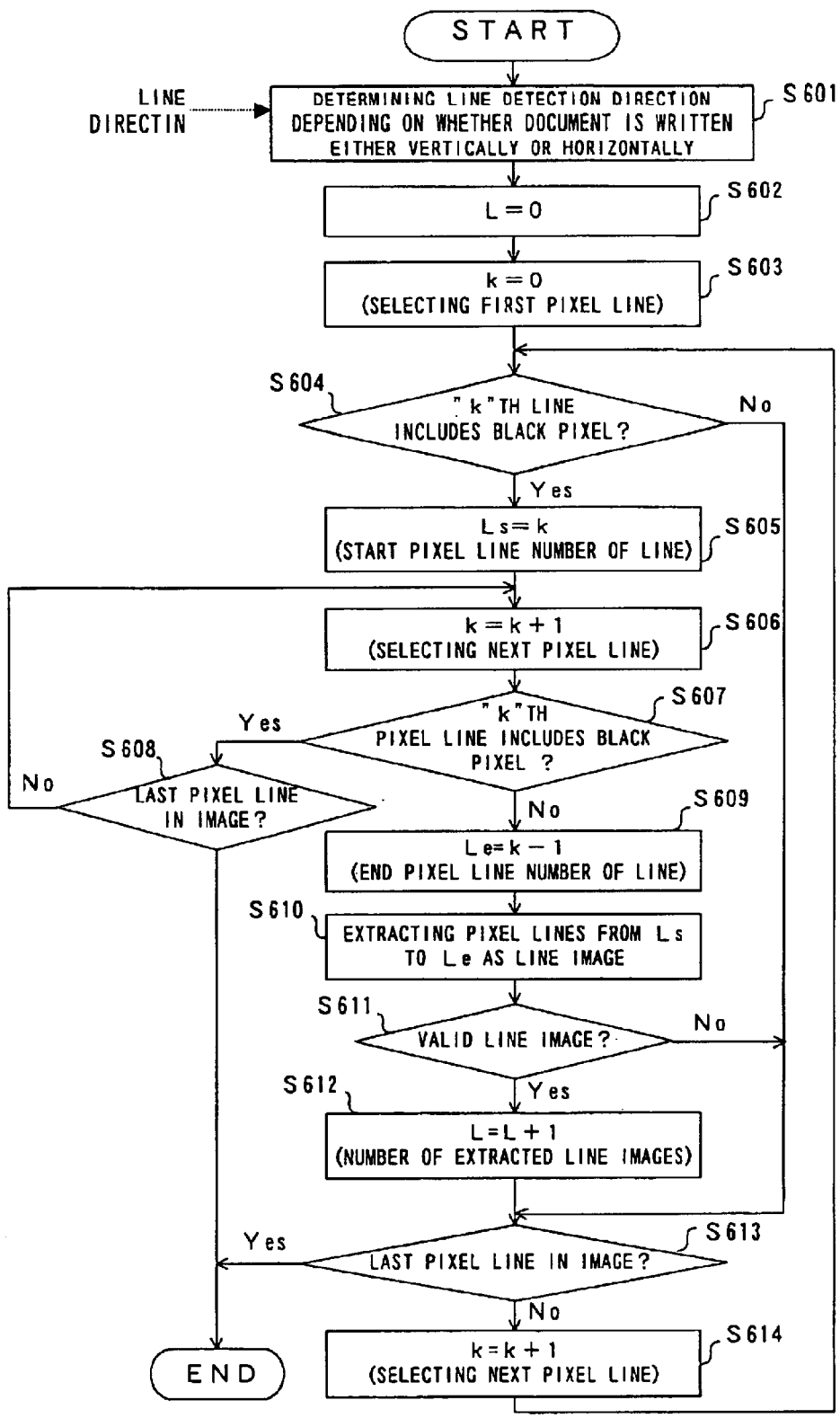
FIG. 6 is a flowchart showing the process for extracting line images.

Initially, a line detection direction is determined depending on whether a document is written either vertically or horizontally (step S601 of FIG. 6). In this process, if a document is horizontally written, the direction where the document images stored in the first and the second image storing units 12 and 13 are read sequentially from the top to the bottom in pixel lines in a horizontal direction, is selected. If the document is vertically written, the direction where the document images are read sequentially from the right to the left in pixel lines in a vertical direction, is selected.

Next, a value "0" is assigned to a counter "L" counting the number of line images as an initial value (step S602). Then, the value "0" is assigned to a pixel line counter "k" indicating a pixel line number, and the first pixel line is selected (step S603). It is determined whether or not the "k"th pixel line specified by the pixel line counter "k" includes a black pixel (step S604).

If the "k"th pixel line includes a black pixel, this pixel line is determined to include a character and the value of the pixel line counter "k" is stored in a register $L_e$ as a start pixel line number of a line (step S605). The value of the pixel line counter "k" is then incremented by 1 to select the next pixel line (step S606). It is determined whether or not the newly specified "k"th pixel line includes a black pixel (step S607).

If the "k"th pixel line includes a black pixel, the process goes to step S608 where it is determined whether or not the "k"th pixel line is the last pixel line in the document image. This determination is made by judging whether or not the pixel line number is larger than the total number of dots in the vertical or the horizontal direction, because the total numbers of dots in the vertical and the horizontal direction in the document are known when the document is read by a scanner.

If the "k"th pixel line is determined not to be the last pixel line in the document image ("NO" in step S608), the process goes back to step S606 where the next pixel line is selected.

If it is determined that the "k"th pixel line does not include a black pixel in step S607, this pixel line is determined to be the last pixel line. This is because the pixel lines up to this line include black pixels, but the next pixel line does not include a black pixel. The process therefore goes to step S609 where "k−1", that is, the number of the immediately preceding pixel line is stored in a register $L_e$ as the last pixel line number of the line. Then, the images of the respective pixel lines with the numbers from the register $L_e$ indicating the start pixel line number to the register $L_e$ indicating the last pixel line number are extracted as a line image (step S610).

Next, it is determined whether or not the extracted line image is valid, that is, whether or not the line image can be used to detect an overlapping position (step S611). In the operation in step S611, there is a strong possibility that not characters but noise or dust on an image are read, for example, if the number of pixel lines in the regions detected as line images is smaller than a preset number of pixel lines, or if the ratio of the number of black pixels to the total number of pixels within the region in a line image is smaller than a preset value. Therefore, the corresponding regions are determined to be unsuitable as line images, and the process goes to step S613.

If the extracted line image is determined to be valid, the value of the counter "L" counting the number of line images is incremented by 1 (step S612). Because the numbers of pixels in a horizontal and a vertical direction in a document image are predetermined, it is determined whether or not the pixel line specified by the pixel line counter "k" is the last pixel line in the document image by making a comparison between the value of the pixel line counter "k" and the number of pixels in the vertical direction in the document image, and by determining whether or not the value of the pixel line counter "k" reaches the number of pixels in the vertical direction (step S613). If the specified pixel line is not the last pixel line in the document image, the value of the pixel line counter "k" is incremented to select the next pixel line (step S614). The process then goes back to step S604, and the above described process is repeated until the last pixel line in the document image is reached.

The above described process for extracting line images is performed for the two document images, so that the start pixel line numbers, the last pixel line numbers, and the numbers of line images are obtained.

Turning back to FIG. 4. After the line images of the first document image are extracted in step S402, the character regions in the extracted line images are detected, and corresponding character codes are obtained after the respective characters within the detected character regions are recognized in the next step S403.

Similarly, the line images of the second document image are extracted in step S404. Then, the character regions in the extracted line images are detected, and the corresponding character codes are obtained after the respective characters within the character regions are recognized in step S405.

Figure 7:
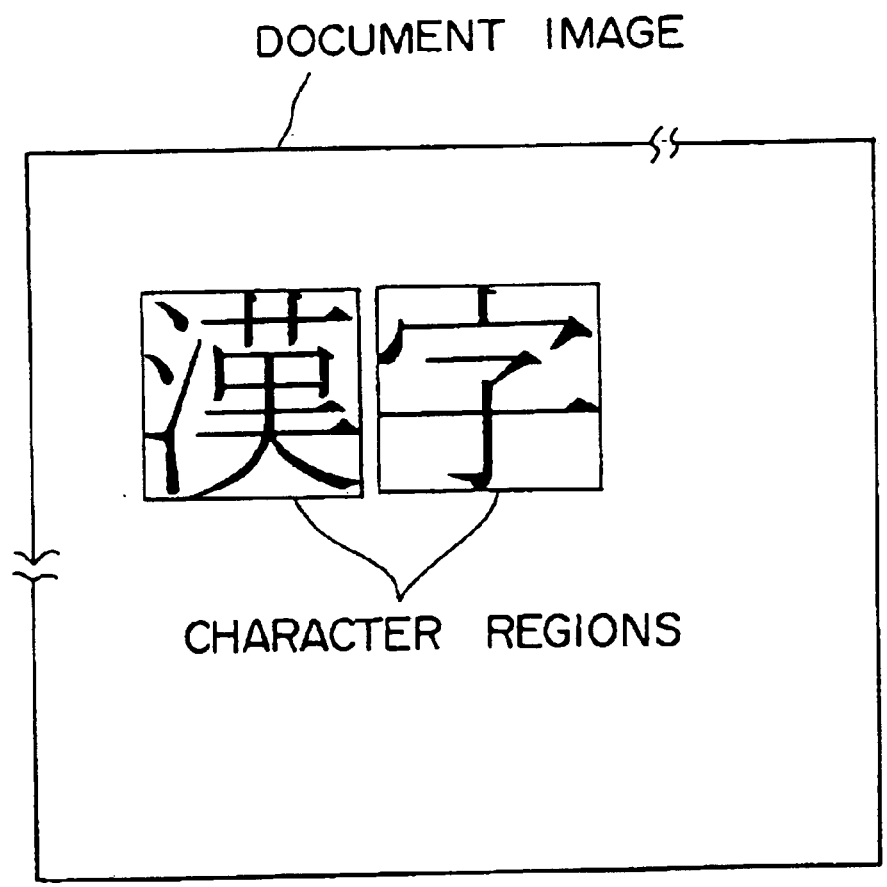
FIG. 7 explains character regions.

A character region indicates a region circumscribed to each character in a document image as shown in FIG. 7. The character region is detected from a line image, and the character within the character region is recognized.

Again turning back to FIG. 4. After the character codes of the two document images are obtained, a comparison direction and order are determined next (step S406).

Suppose that a horizontally written document is partitioned into two portions and scanned as shown in FIG. 8A. For the direction and the order of the comparison between line images in this case, it seems the most frequent case where the upper half of the document image is firstly scanned and then the lower half. Therefore, selected as the comparison direction with top priority of a horizontally written document is the direction where one or a plurality of horizontal line images at the top of the second document image are compared with the horizontal line images at the bottom of the first document image sequentially from the last line toward the center, or the direction where one or a plurality of horizontal line images at the bottom of the first document image are compared with the horizontal line images at the top of the second document image sequentially from the first line toward the center as shown in FIG. 9A.

Additionally, suppose that a vertically written document image is partitioned into two portions and scanned as shown in FIG. 8B. In this case, it seems the most frequent case where the right half of the document image is firstly scanned and then the left half. Therefore, selected as the comparison direction with the highest priority of a vertically written document is the direction where one or a plurality of vertical line images at the right side of the second document image are compared with the vertical line images at the left side of the first document image sequentially from the leftmost line toward the center, or the direction where one or a plurality of vertical line image at the left side of the first document image are compared with the vertical line image at the right side of the second document image sequentially from the right line toward the center, as shown in FIG. 9D.

Furthermore, suppose that the lower half of a horizontally written document is first scanned and then the upper half. In this case, selected as the comparison direction with the second highest priority of a horizontally written document is the direction where the horizontal line images in the second document image are compared sequentially from the bottom toward the center, or the direction where the horizontal line images in the first document image are compared sequentially from the top toward the center as shown in FIG. 9B.

Still further, suppose that the left half of a vertically written document is first scanned and then the right half. In this case, selected as the comparison direction with the second highest priority of a vertically written document is the direction where the vertical line images in the first document image are compared sequentially from the right toward the center, or the direction where the vertical line images in the second document image are compared sequentially from the left toward the center as shown in FIG. 9C.

Figure 10A:
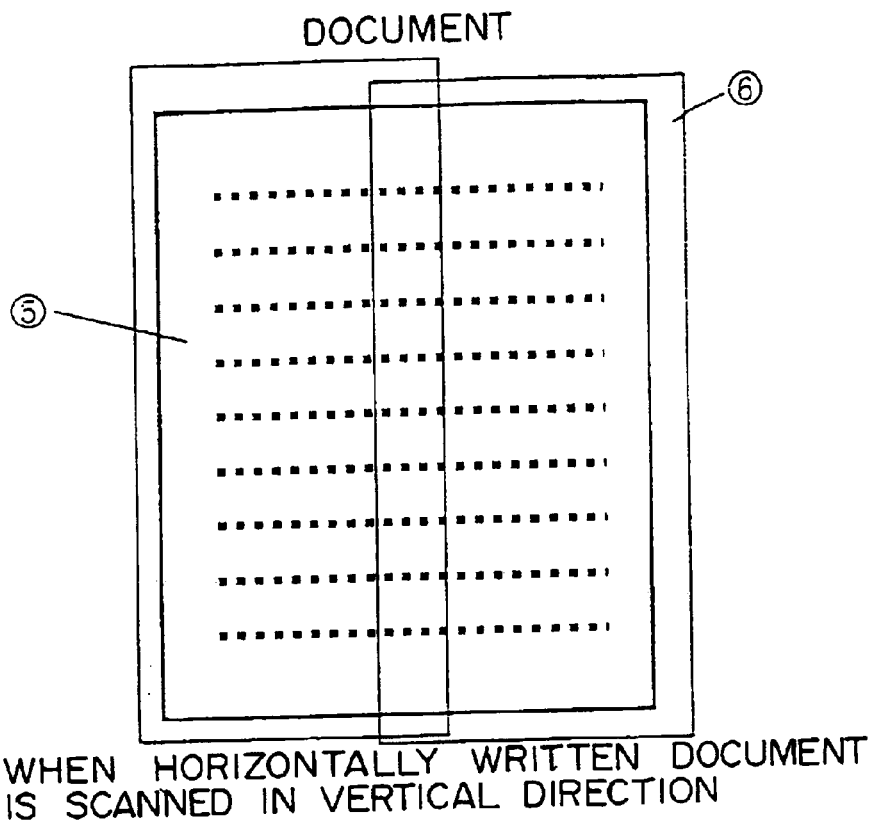
FIGS. 10A and 10B explain the scanning orders of documents.
Figure 10B:
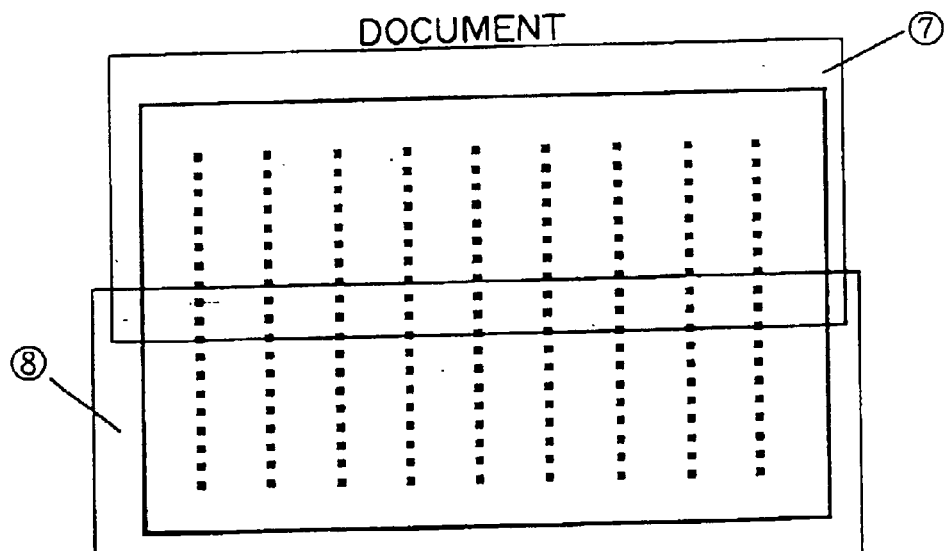

As occasion demands, a horizontally written document image may be partitioned into two portions in a vertical direction and scanned as shown in FIG. 10A, or a vertically written document image may be partitioned into two portions in a horizontal direction and scanned as shown in FIG. 10B.

The merging direction of document images is determined according to their scanning direction and order. Four directions shown in FIG. 11 are considered as the merging direction of document images in the case where a vertically written document is partitioned into two portions and scanned.

Figure 11A:
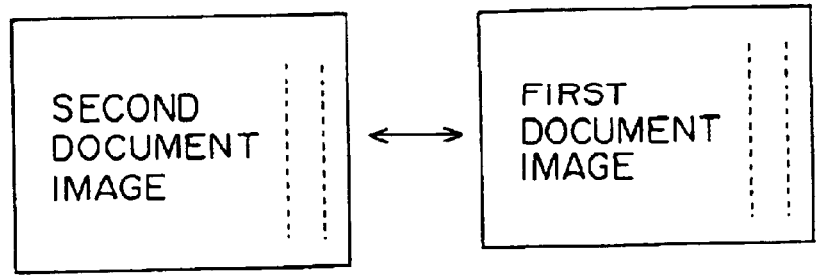
FIGS. 11A through 11D explain the merging directions of vertically written documents.

(1) If the right half of the vertically written document image is first scanned and then its left half, the left edge of the first document image that is firstly read and the right edge of the second document image that is secondly read must be merged as shown in FIG. 11A.

Figure 11B:
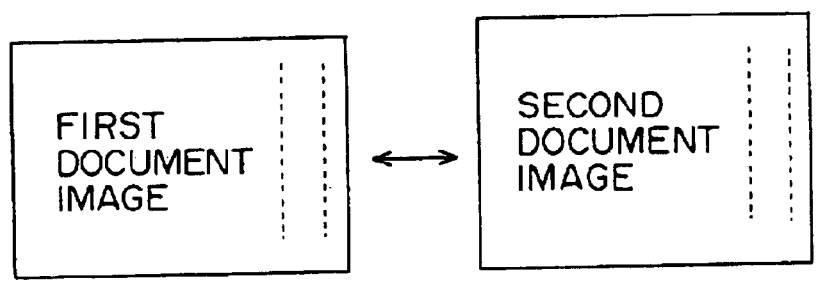

(2) If the left half of the vertically written document image is firstly scanned and then its right half, the right edge of the first document image that is firstly read and the left edge of the second document image that is secondly read must be merged as shown in FIG. 11B.

Figures 11C, 11D:
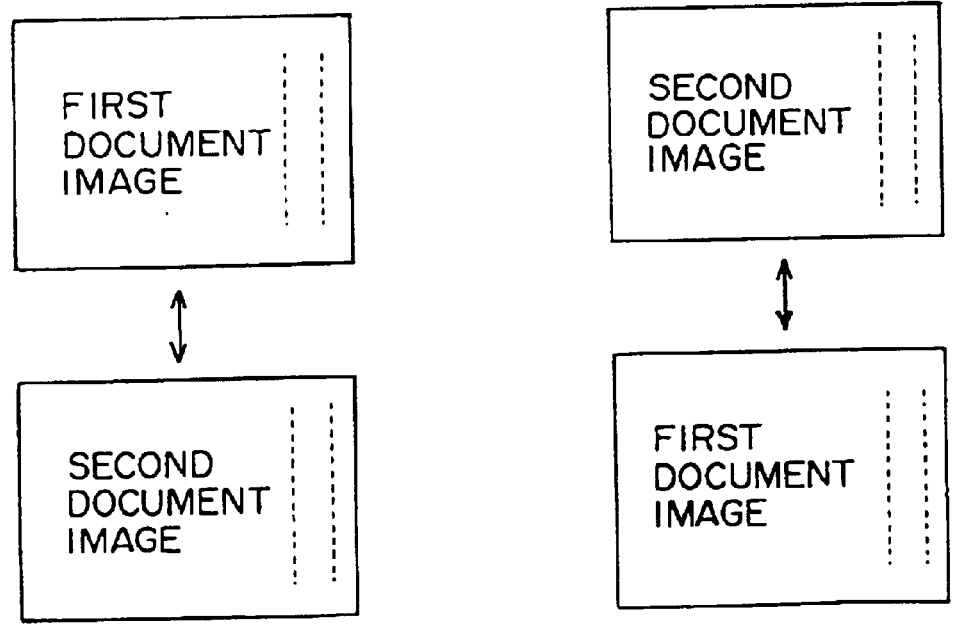

(3) If the upper half of the vertically written document is firstly scanned and then its lower half, the bottom of the first document image that is firstly read and the top of the second document image that is secondly read must be merged as shown in FIG. 11D.

(4) If the lower half of the vertically written document is firstly scanned and then its upper half, the top of the first document image that is firstly read and the bottom of the second document image that is secondly read must be merged as shown in FIG. 1D.

Additionally, four directions shown in FIG. 12 are considered as the merging direction of document images in the case where a horizontally written document is partitioned into two portions and scanned.

(1) If the upper half of the horizontally written document is firstly scanned and then its lower half, the bottom of the first document image that is firstly read and the top of the second document image that is secondly read must be merged as shown in FIG. 12A.

(2) If the lower half of the horizontally written document is firstly read and then its upper half, the top of the first document image that is firstly read and the bottom of the second document image that is secondly read must be merged as shown in FIG. 12B.

(3) If the left half of the document image is firstly scanned and then its right half, the right edge of the first document image that is firstly read and the left edge of the second document image that is secondly read must be merged as shown in FIG. 12C.

(4) If the right half of the horizontally written document is firstly scanned and then its left half, the left edge of the first document image that is firstly read and the right edge of the second document image that is secondly read must be merged as shown in FIG. 12D.

When the comparison direction and order are determined based on the above described directions and orders, the process for detecting an overlapping portion in step S407 of FIG. 4 is performed. This process will be described in detail later.

In the next step S408, whether or not an overlapping position is detected is determined. If the overlapping position is determined to be detected, the first and he second document images are merged at the detected overlapping position (in step S409).

In this way, a user can merge two document images into one image without performing any operation for merging the two document images that are partitioned and read.

Figure 13:
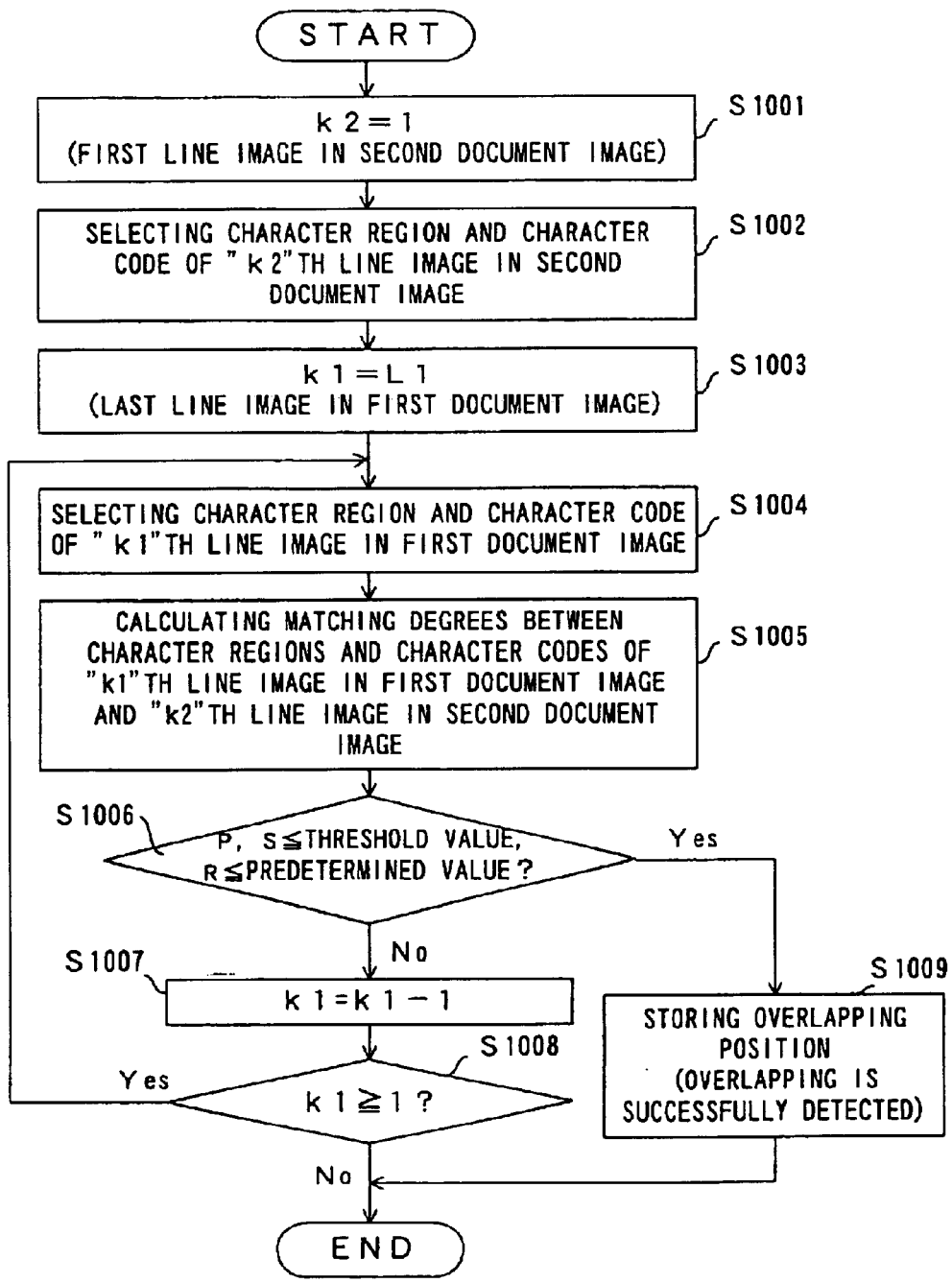
FIG. 13 is a flowchart showing the process for detecting an overlapping position (No. 1)

Here, the process for detecting an overlapping position in step S407 of FIG. 4 is explained by referring to the flowchart shown in FIG. 13.

Initially, the comparison between line images is made by assuming the case where the upper half of a horizontally written document is first scanned and then its lower half to include an overlapping portion (as shown in FIG. 9A), or the case where the right half of a vertically written document is first scanned and then its left half to include an overlapping portion (as shown in FIG. 9D).

The first line image in the second document image is specified by assigning 1 to a line counter "k2" specifying a line image in the second document image (step S1001 of FIG. 13). Then, the coordinates, the sizes, and the character codes of the character regions in the "k2"th line image are obtained (step S1002).

Figure 14A:
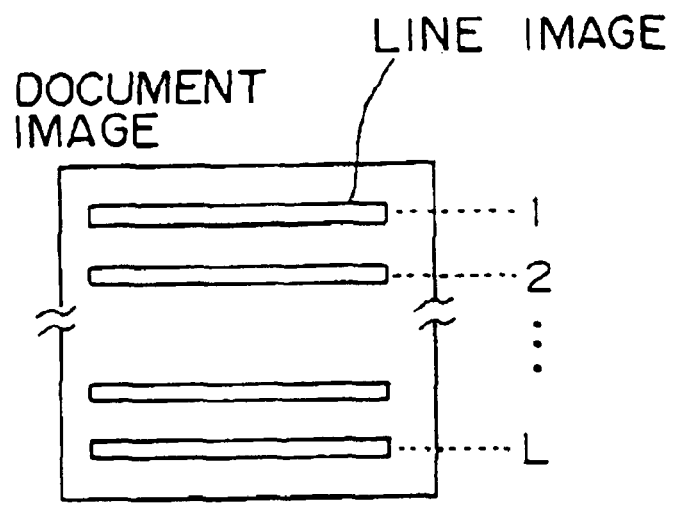
FIGS. 14A and 14B explain the line image numbers of horizontally and vertically written document images.
Figure 14B:
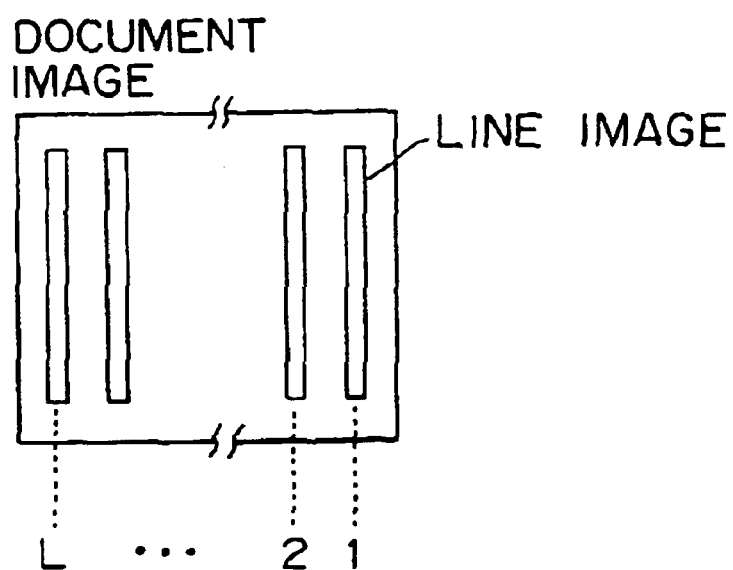

Here, the line numbers in a document image are automatically determined depending on a direction where the document is scanned. For example, if a horizontally written document is scanned from the top to the bottom as shown in FIG. 14A, the line number of the first line image in the upper image is set to 1, and the subsequent line numbers are set to from 2. Or, if a vertically written document image is scanned from the right to the left as shown in FIG. 14B, the line number of the first line image in the right image is set to 1, and the subsequent line numbers are set to from 2.

Next, a line number "L1" of the last line in the first document image is assigned to a line counter "k1" specifying a line image in the first document image (step S1003 of FIG. 13).

The reason why the line number of the first line in the second document image is assigned to the line counter "k2" and the line number of the last line in the first document image is assigned to the line counter "k1" in the above described process is as follows. Since the upper half (or the right half) of a document image is firstly scanned and then the lower half (or the left half) in many cases when a horizontally (or vertically) written document is partitioned into the upper and the lower portions, there is a strong possibility that the line image in the lower half (or the left half) of the first document image matches the line image in the upper half (or the right half) of the second document image succeeding the first image, so that an overlapping position can be detected by a small number of times that a comparison is made sequentially from between the first line of the second document image and the last line of the first document image toward the center.

Next, the character regions of the "k1"th line image in the first document image, which is specified by the line counter "k1", and the corresponding character codes are obtained (step S1004).

Then, the discrepancy between the differences in the positions of adjacent character regions in the "k2"th (such as the 1st) line image in the second document image and the differences in the positions of adjacent character regions in the "k1"th (such as the last) line image in the first document image, the sizes of the respective character regions, and the matching degree between the character codes of the "k2"th line image in the second document image and those of the "k1"th line image in the first document image are calculated (step S1005). Then, it is determined whether or not the values of the evaluation expressions representing the relative positions and the sizes of the character regions in the two line images are equal to or smaller than threshold values, and whether or not the value representing the matching degree between the character codes is equal to or smaller than a predetermined value (step S1006).

Figure 15:
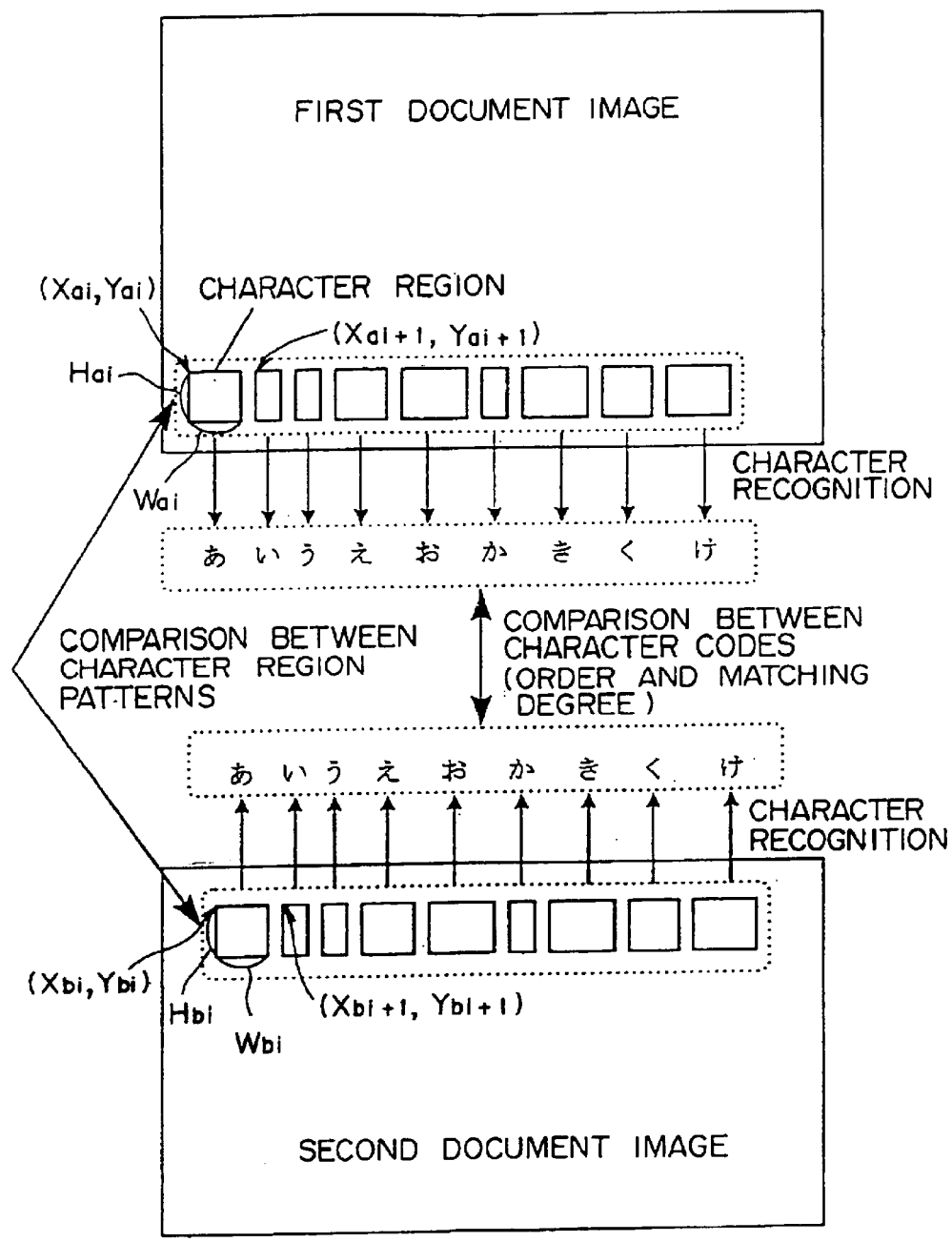
FIG. 15 explains the case where an overlapping position is detected by making the comparisons between character region patterns and character codes.

The matching degrees between the relative positions and the sizes of character regions in line images in two document images are represented by the following equations if it is assumed that the coordinates at the upper left corner of an "i"th character region in a line image in the first document image is $(X_{ai}, Y_{ai})$, the height and the width of the character region are respectively $H_{ai}$ and $W_{ai}$, the coordinates of an "i+1"th character region are $(X_{ai+1}, Y_{ai+1})$, the coordinates at the upper left corner of the "i"th character region in a line image in the second document image are $(X_{bi}, Y_{bi})$, the height and the width of the character region are respectively $H_{bi}$ and $W_{bi}$, and the coordinates of an "i+1"th character region are $(X_{bi+1}, Y_{bi+1})$, when the upper left corner of the document image is defined to be an origin as shown in FIG. 15.

$$P = \Sigma((|X_{ai+1} - X_{ai}| - |X_{bi+1} - X_{bi}|^2 (|Y_{ai+1} - Y_{ai}| - |Y_{bi+1} - Y_{bi}|^2) \quad (1)$$

$$S = \Sigma((W_{ai+1} - W_{bi})^2 + (H_{ai+1} - H_{bi})^2) \quad (2)$$

$|X_{ai+1} - X_{ai}|$ and $|Y_{ai+1} - Y_{ai}|$ in the above described equation (1) respectively indicate the differences between the positions of the upper left corners of the "i+1"th and the "i"th character regions in the first document image in the horizontal and the vertical directions. Similarly, $|X_{bi+1} - X_{bi}|$ and $|Y_{bi+1} - Y_{bi}|$ respectively indicate the differences between the positions of the upper left corners of the "i+1"th and "i"th character regions in the second document image in the horizontal and the vertical directions. Accordingly, $|X_{ai+1} - X_{ai}| - |X_{bi+1} - X_{bi}|$ indicates the discrepancy of the difference between the positions of the upper left corners of the "i+1"th and the "i"th character regions in the horizontal direction in the two document images. Similarly, $|Y_{ai+1} - Y_{ai}| - |Y_{bi+1} - Y_{bi}|$ indicates the discrepancy of the difference between the positions of the "i+1"th and the "i"th character regions in the vertical direction in the two document images. By accumulating the discrepancies of the difference between the positions of the upper left corners of adjacent character regions in the two document images, the matching degree between the relative positions of the character regions in the line images in the two document images can be obtained. The reason that the discrepancies are squared is to prevent them from being cancelled by negating each other.

If the line images in the two document images match, the differences between the positions of adjacent character regions in the line images in the vertical and the horizontal direction become identical, so that the discrepancies become small. That is, the value of P in the equation (1) becomes "0" or a value close to "0". If the line images mismatch, the discrepancies of the differences between the positions of adjacent character regions in the line images in the vertical and the horizontal direction become large, so that also the value of "P" increases. If the line images perfectly match, the value of "P" becomes "0". However, a predetermined threshold value is compared with "P" in consideration of an occurrence of some distortion. This is because the line images are scanned images. If "P" is equal to or smaller than the threshold value, the lines are determined to overlap.

"S" in the equation (2) represents differences between the widths and the heights of character regions. The value of "S" becomes smaller as the matching degree between the line images is higher when the sizes of the character regions match.

Furthermore, the value "R" indicating the matching degree between character codes can be represented by:

"$R = \Sigma |M_{ai} == M_{bi}?0:1|/N$"

where $M_{ai}$ and $M_{bi}$ represent the character code of the "i"th character in the first and the second document images, and "N" represents the number of characters in one line. The value within $\Sigma \oplus M_{ai} == M_{bi}?0:1|/N$ in the above provided equation becomes "0" if the character codes match, and "1" if the character codes mismatch. Therefore, the value "R" on the left side, which represents the matching degree, becomes smaller as the matching degree between the character codes is higher.

Turning back to FIG. 13. The values of "P" and "S", which respectively represent the matching degrees between the positions and the sizes of character regions, and the value of "R representing the matching degree between character codes are respectively compared with predetermined threshold values. If the values of "P" and "S" are larger than the predetermined threshold values, or if the value of "R" representing the matching degree between character codes is larger than the predetermined value, the two line images are determined to mismatch. The next line image is then specified by subtracting 1 from the value of the line counter "k1" (step S1007). Next, it is determined whether or not the value of the counter "k1" is equal to or larger than "1", that is, whether or not the comparison of the line images in the first document image is terminated from the last to the first line (step S1008).

If the value of the counter "k1" is equal to or larger than 1, that is, if a line image yet to be compared is left in the first document image, the process goes back to step S1004 where the character regions and the character codes in the "k1"th line image are obtained. Then, the above described process is repeated.

In the meantime, if the values of "P" and "S" are equal to or smaller than the predetermined threshold values as a result of the above described comparison between the line images, and if the value "R indicating the matching degree between character codes is equal to or smaller than the predetermined value ("YES" in step S1006), the line images are determined to match. In this case, the process goes to step S1009 where the coordinates of the matching line images are stored as an overlapping position.

If the value of the counter "k1" of the first document image is determined to be equal to or smaller than "0" in step S1008, that is, if no matching line image exists as a result of the comparison made between all the line images in the first document image and the first line image in the second document image, it is determined that the document scanning direction is different, namely, it is determined that the upper half of the document is not firstly scanned and its lower half is not secondly scanned. Accordingly, the line images are compared in the comparison direction with the second highest priority.

Figure 16:
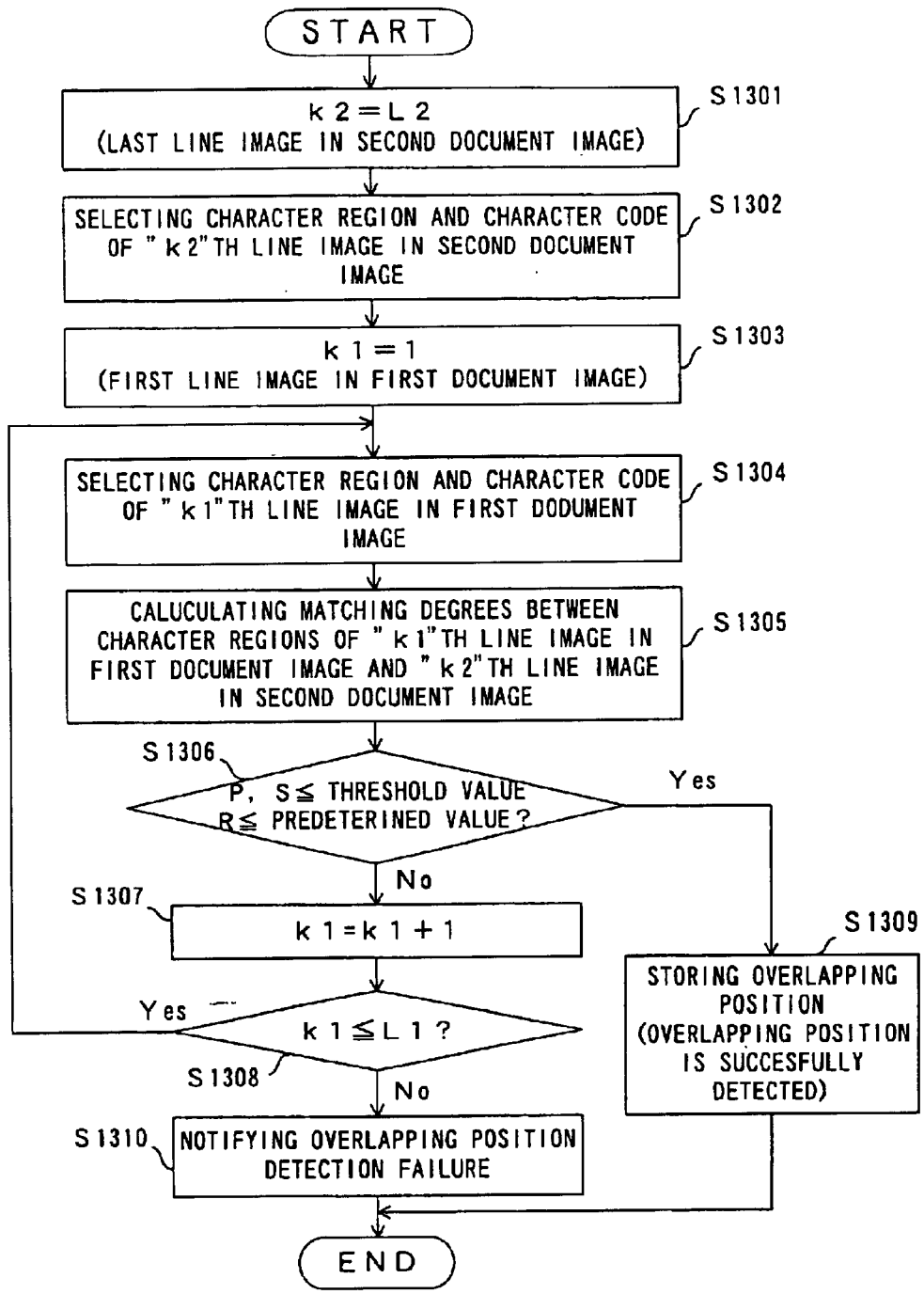
FIG. 16 is a flowchart showing the process for detecting an overlapping position (No. 2)

Next, the process for detecting an overlapping position in the comparison direction with the second highest priority is explained by referring to the flowchart shown in FIG. 16.

The comparison direction with the second highest priority assumes the case where the lower half (or the left half) of a document image is firstly scanned and then its upper half (or right half). Therefore, the line number "L2" of the last line in the second document image is assigned to the line counter "k2" specifying a line image in the second document image so as to make a comparison between the last line image in the second document image and the respective line images in the first document image (step S1301 of FIG. 16). Furthermore, the character regions and the character codes in the "k2"th line image in the second document image are obtained (step S1302).

Next, the first line image is specified by assigning the value "1" to the line counter "k1" specifying a line image in the first document image (step S1303). Then, the calculations of the evaluation expressions representing the matching degrees between the coordinates and the sizes of the character regions in the "k1"th line image in the first document image and the "k2"th line image in the second document image, and the calculation of the value "R" indicating the matching degree between character codes are made (step S1304). The matching degrees between the coordinates and the sizes of character regions are calculated by using the above described evaluation expressions (1) and (2).

Then, it is determined whether or not the values of "P" and "S" in the evaluation expressions are equal to or smaller than predetermined threshold values, and whether or not the value "R" indicating the matching degree between character codes is equal to or smaller than a predetermined value (step S1306). If the values of "P" and "S" are larger than the threshold values, or if the value "R" indicating the matching degree between character codes is larger than the predetermined value ("NO" in step S1306), the two line images are determined to mismatch. The process goes to step 1307 where 1 is added to the value of the line counter "k1" to specify the next line. It is then determined whether or not the value of the line counter "k1" is equal to or smaller than the last line number "L1" in the first document image.

If the value of the line counter "k1" is equal to or smaller than the last line number "L1" ("NO" in step S1308), the process goes back to step S1304 where the character regions and the character codes in the line image specified by the line counter "k1" are obtained. The character regions and character codes are compared with those in the last line in the second document image.

If the values of "P" and "S" are determined to be equal to or smaller than the threshold values and if the value "R" indicating the matching degree between character codes is determined to be equal to or smaller than the predetermined value ("YES" in step S1306), the line images in the first and the second document images are determined to match. The process therefore goes to step S1309 where the coordinates of the line images are stored as overlapping position coordinates.

If the value of the line counter "k1" exceeds the last line number "L1" ("NO" in step S1308), no matching line images are determined to exist as a result of the comparison made between the line images in the two documents in the two comparison directions with the highest and the second highest priorities. In this case, the process goes to step S1310 where the failure in the detection of an overlapping position is notified.

According to the second preferred embodiment, when a document is partitioned into a plurality of (two or more) document images and read, the position(s) at which the document images overlap can be found by detecting matching line images as a result of the comparisons made between the positions, the sizes, and the character codes of the character regions in the line images in the read document images. As a result, the document images which are partitioned and read can be automatically merged.

In the above described preferred embodiment, line images are compared by using both of the positions and the sizes of character regions in the line images in document images, and the corresponding character codes. However, in a system which cannot be equipped with an OCR, such as a system where a storage capacity is insufficient for storing dictionary data, a low-speed system where an OCR process requires a lot of time, and the like, only the positions and the sizes of character regions may be compared. Furthermore, since there is a low probability that characters are arranged in the same orders in a plurality of lines, not the sizes and the positions of characters but only character codes may be compared.

Figure 17:
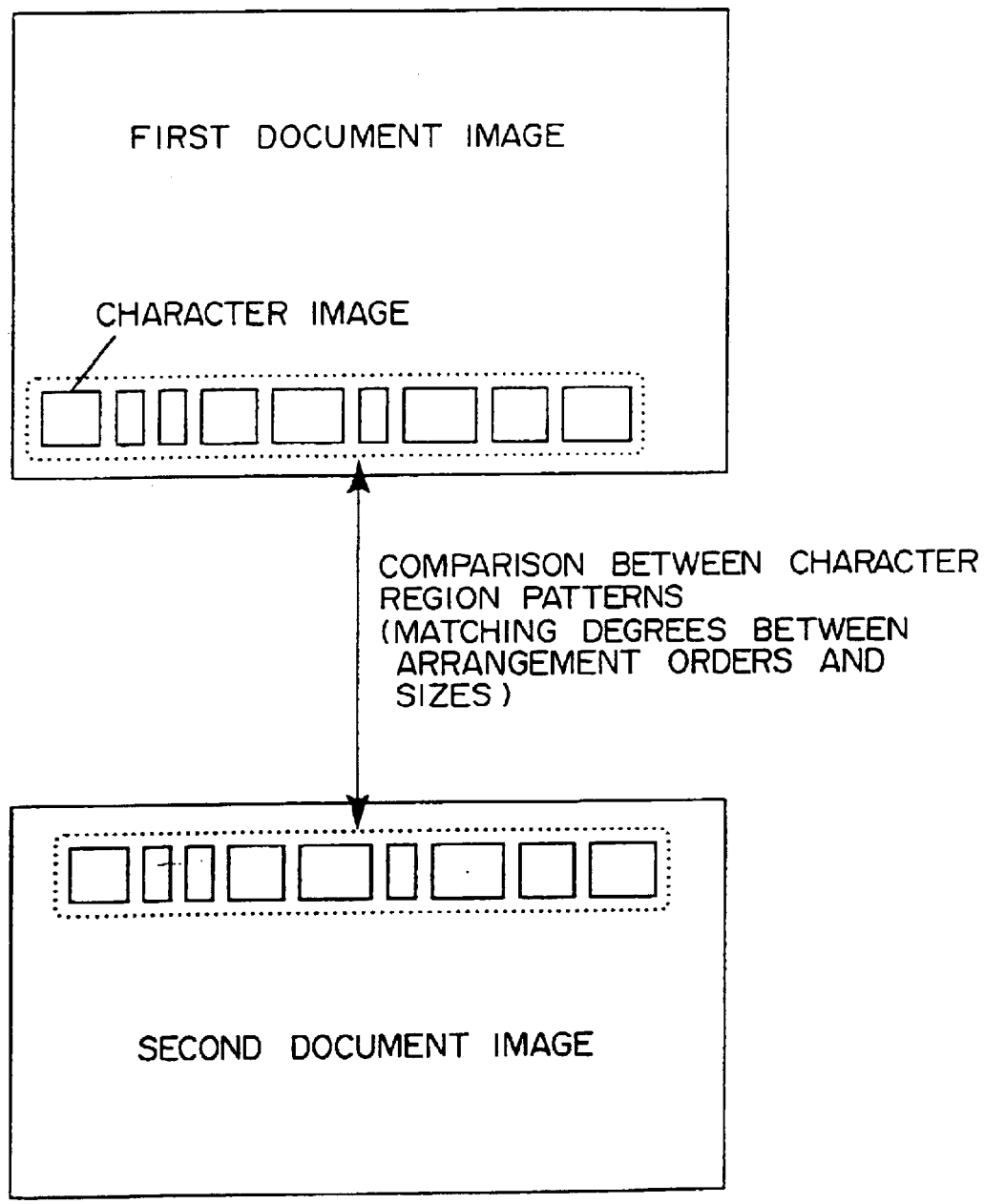
FIG. 17 explains the case where an overlapping position is detected by making a comparison between character region patterns.

FIG. 17 explains the method for detecting the position at which document images overlap by making the comparison between the patterns of character regions in the document images, that is, the positions and the sizes of the character regions, according to the first preferred embodiment of the present invention.

Also this overlapping position detection process in the first preferred embodiment is fundamentally the same as that in the second preferred embodiment. That is, the direction where corresponding line images are compared when the upper half of a document image is firstly scanned and then its lower half is defined as the comparison direction with the highest priority, and the direction where corresponding line images are compared when the lower half of the document image is firstly scanned and then its upper half is defined as the comparison direction with the second highest priority.

In step S1006 of FIG. 13, where the matching degree between line images is determined in the comparison direction with the highest priority, that is, by making the comparison between the positions and the sizes of the character regions in the first line image in the second document image and the positions and the sizes of the character regions in the last line in the first document image. If the line images are determined to match, for example, the coordinates of the leftmost character and the rightmost character regions in the line images are stored as overlapping position coordinates in step S1009. The two document images are then merged at this overlapping position.

Because the matching degree between line images is determined only from the positions and the sizes of character regions in the line images in the first preferred embodiment, the program of the overlapping position detection process becomes simpler and its processing time becomes shorter in comparison with the case where the matching degree is determined not only by making the comparison between the positions and the sizes of character regions, but also by performing character recognition.

Figure 18:
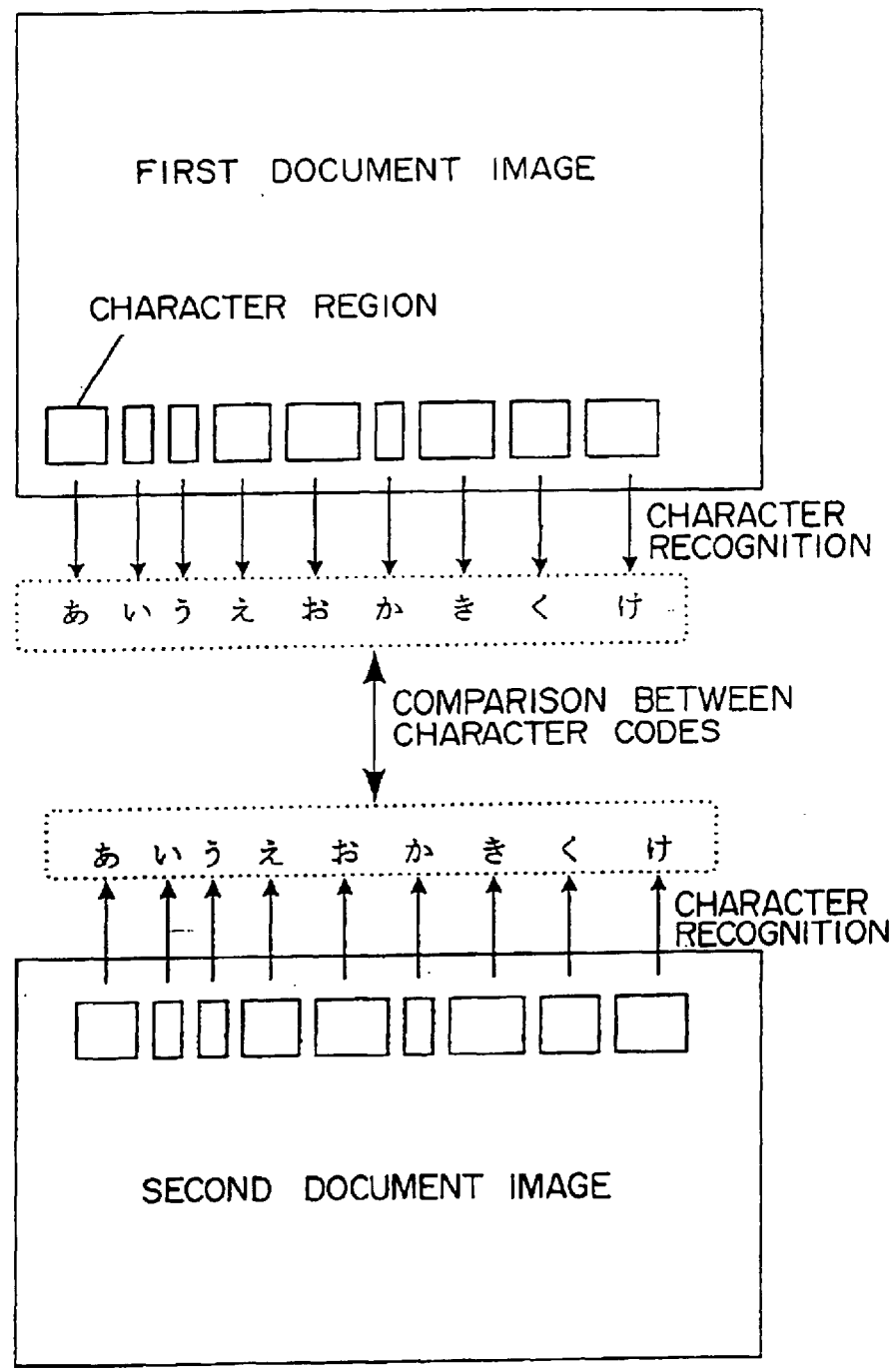
FIG. 18 explains the case where an overlapping position is detected by making a comparison between character codes.

Explained next is the method for detecting an overlapping position by making the comparison only between character codes in line images in document images which are partitioned and read, according to a third preferred embodiment by referring to FIG. 18.

The fundamental configuration of the document image processing device according to the third preferred embodiment is similar to that of the document image processing device shown in FIG. 2.

In the third preferred embodiment, after the character codes in the first line image in the second document image and the character codes in the last line image in the first document image are obtained in steps S1002 and 1004 of the flowchart shown in FIG. 13, the value "R" indicating the matching degree between character codes in the two document images is calculated in step S1005. If the value indicating the matching degree is equal to or smaller than a predetermined value, the line images are determined to match and the coordinates of the line images are stored as overlapping position coordinates in step S1009.

According to the third preferred embodiment, the position at which two document images overlap can be detected by obtaining character codes after recognizing the characters in the line images in the document images which are partitioned and read, and by making the comparison between the character codes in line units in the document images, which eliminates the need for putting alignment marks on each of the documents. Consequently, the document images can be merged with ease.

Explained next is the method for detecting the position at which a plurality of document images are merged by partitioning read document images into a plurality of regions, by extracting line images from the partitioned regions, and by making the comparison between the characters included in the line images in the respective regions, according to a fourth preferred embodiment.

The fundamental configuration of the document image processing device according to this preferred embodiment is the same as that of the document image processing device 21 shown in FIG. 2. Differences from the configuration shown in FIG. 2 are that the character region detecting unit 14 has a capability for respectively partitioning the first and the second document images stored in the first and the second image storing units 12 and 13 into a plurality of regions, and a capability for extracting line images from the respective regions.

Figure 19:
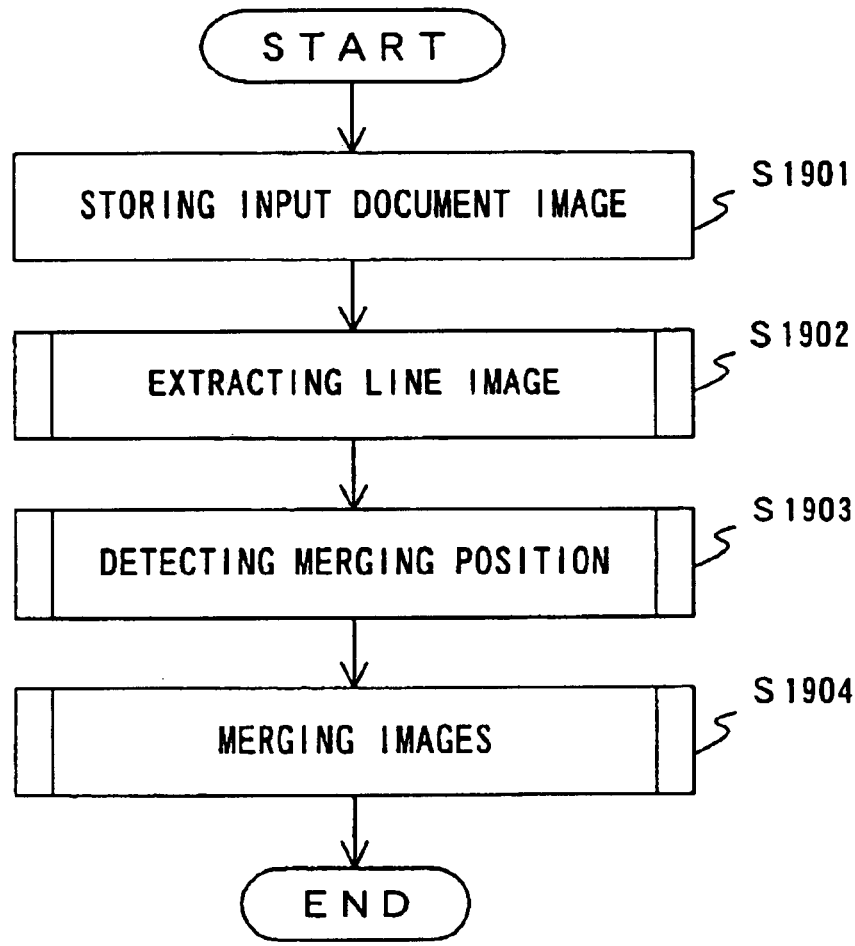
FIG. 19 is a flowchart showing the outline of the process performed in a fourth preferred embodiment.

FIG. 19 is a flowchart showing the outline of the process according to the fourth preferred embodiment. Initially, document images which are partitioned and read by a scanner are stored sequentially in the first and the second document storing units 12 and 13 (step S1901 of FIG. 19). Next, the first and the second document images are respectively partitioned into a plurality of regions, and line images are extracted from the respective regions (step S1902).

Figure 20:
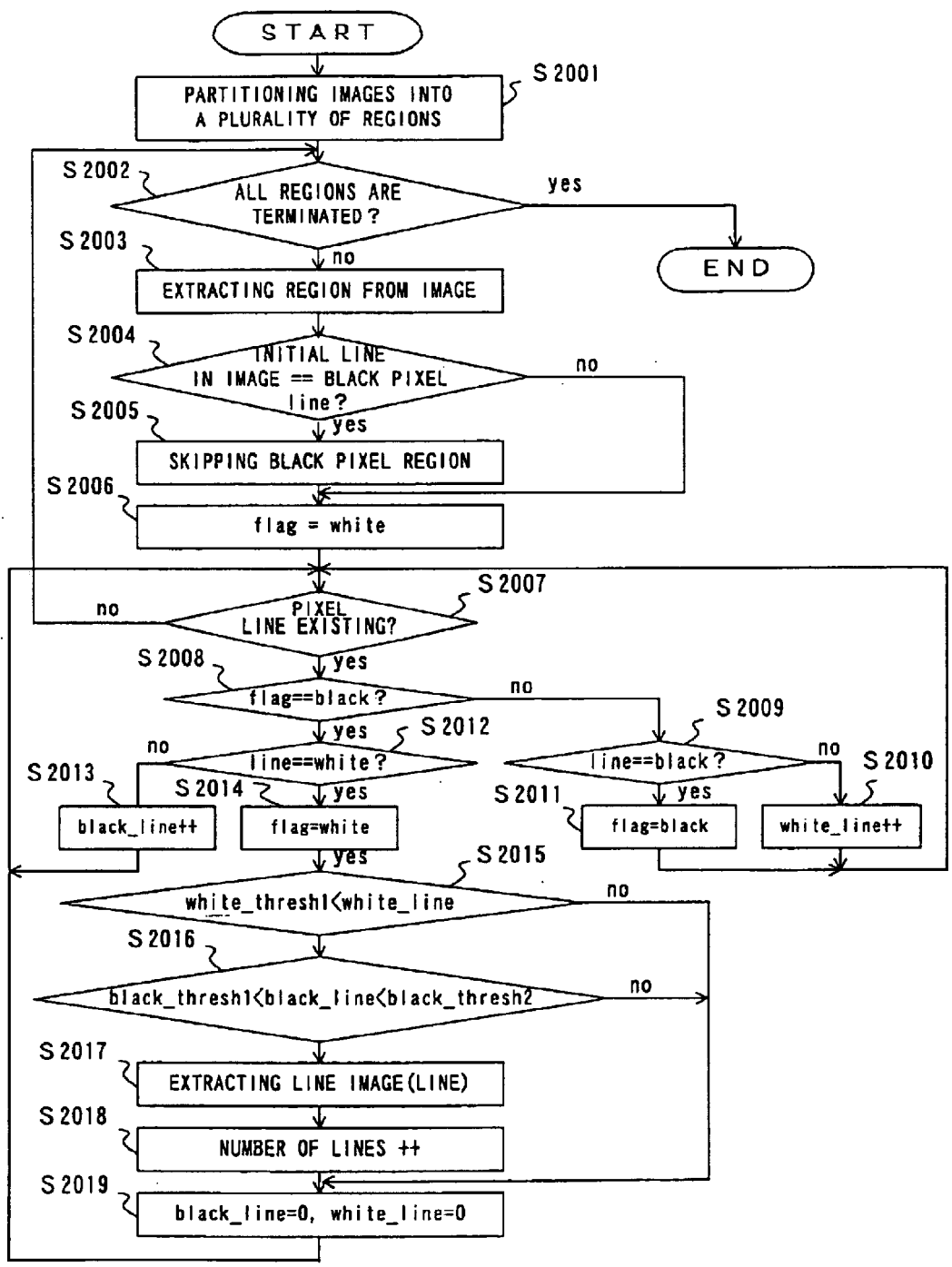
FIG. 20 is a flowchart showing the process for extracting line images.

Here, the process for extracting line images, which is performed in step S1901 of FIG. 19, is explained by referring to FIG. 20.

Initially, the first and the second document images which are partitioned and read are respectively partitioned into a plurality of regions in the vertical and the horizontal directions (step S2001 of FIG. 20). Next, it is determined whether or not the extraction of the line images from all the regions is completed (step S2002).

If the extraction from all the regions is not completed ("NO" in step S2002), the process goes to step S2003 where one of the regions which are partitioned in the vertical and the horizontal directions is extracted from among the plurality of regions in the first and the second document images.

Next, white and black pixel lines are detected in the direction vertical to the lines partitioning the regions, and it is determined whether or not the first pixel line in the image is a black pixel line. The determination of whether a pixel line is either black or white is made as follows: a pixel line including black pixels the number of which is larger than a predetermined value is determined to be a black pixel line, while a pixel line including black pixels the number of which is smaller than the predetermined value is determined to be a white pixel line.

Figure 21A:
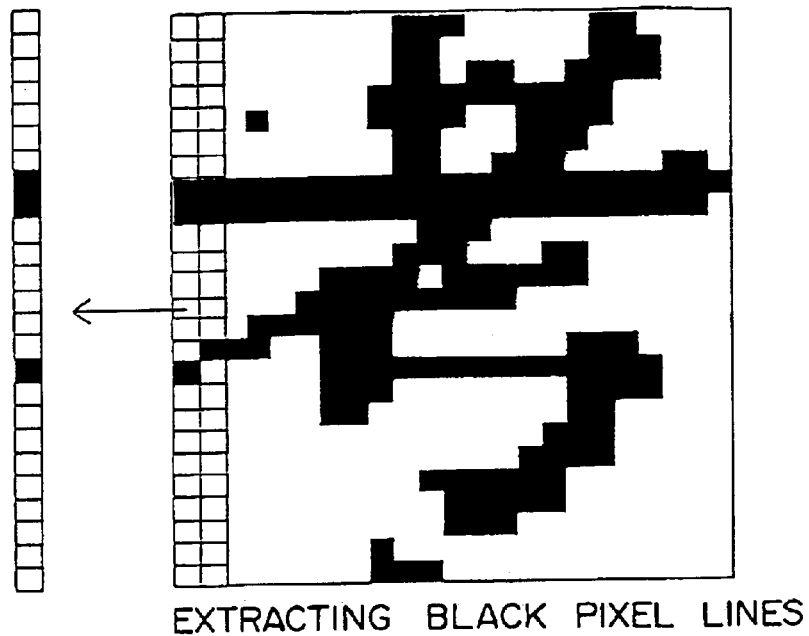
FIGS. 21A and 21B explain the method for extracting white pixel and black pixel lines.

FIG. 21 explains the method for extracting white and black pixel lines. For example, if the direction vertical to the lines partitioning the regions is the vertical direction shown in FIG. 21A, the leftmost pixel line in the character shown in FIG. 21A includes three black pixels. Supposing that this character is a character in a vertically written document, one pixel line includes also the black pixels of other characters as a matter of course. Therefore, many black pixels are detected in the entire pixel line, so that this pixel line is determined to be a black pixel line.

Figure 21B:
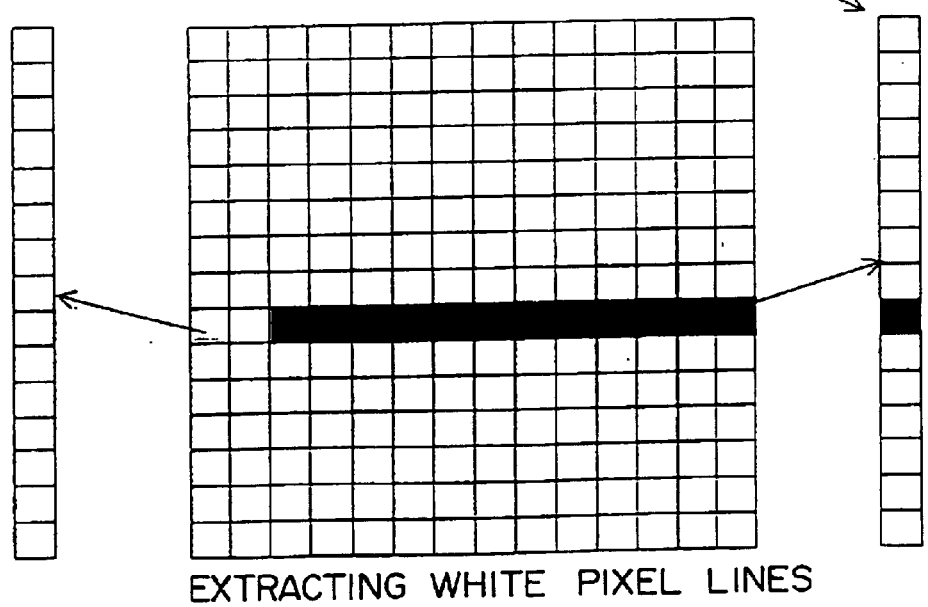

In the meantime, a pixel line including no characters in FIG. 21B, for example, the leftmost pixel line in FIG. 21 includes no black pixels. Accordingly, since the number of black pixels is equal to or smaller than a predetermined value even in the entire pixel line, this pixel line is determined to be a white pixel line. If a pixel line is selected in the direction orthogonal to a ruled line when the ruled line exists, one black pixel as the ruled line is included as illustrated in the rightmost pixel line in the region of FIG. 21B. However, no black pixel other than the ruled line exists in the entire pixel line, this pixel line is determined to be a white pixel line.

Turning back to FIG. 20. If the first line in the image is determined to be a black pixel line ("YES" in step S2004), the black pixel region is skipped to detect a white pixel line (step S2005). The reason is as follows. If the initially detected region is a black pixel region, not the whole but part of the character can be possibly read during scanning. Therefore, this black pixel region is prevented from being used to detect the position at which document images are merged.

If the first pixel line in the region is a black pixel line and a white pixel line is detected next after skipping the black pixel region, or if the first pixel line in the region is determined not to be a black pixel line in step S2004, a flag is set to "white" in step S2006. Then, it is determined whether or not a line the pixels of which are yet to be determined is left in the region (step S2007). If the line the pixels of which are yet to be determined is left ("YES" in step S2007), it is further determined whether or not the flag is "black" (step S2008).

If the flag is determined not to be "black" ("NO" in step (S2008), that is, if a white pixel line is detected next to the first black pixel region, or if the first pixel line is a white pixel line, the process goes to step S2009 where it is determined whether or not the next pixel line is a black pixel line.

If the next line is determined not to be a black pixel line ("NO" in step S2009), the process goes to step S2010 where a counter "white_line" for counting the number of white pixel lines is incremented to specify the next line.

When a black pixel line next to the white pixel line is detected during the repetition of the process in steps S2007 through S2010, the determination in step S2009 results in "YES". The process therefore goes to step S2011 where the flag is set to "black".

When the flag becomes "black", the determination in step S2008 results in "YES". The process therefore goes to step S2012 where it is determined whether or not the pixel line is a white pixel line.

If the pixel line is determined not to be a white pixel line ("NO" in step S2012), the process goes to step S2013 where a counter "black_line" for counting the number of black pixel lines is incremented (black_line++). Then, the process goes back to step S2007 where the number of black pixel lines is counted while sequentially detecting pixel lines.

When the next white pixel line is detected after the detection of the black pixel line ("YES" in step S2012), the process goes to step S2014 where the flag is set to "white".

After the white pixel line and the succeeding black pixel line are detected as described above, it is determined whether or not the value of the counter "white_line" for counting the number of white pixel lines is larger than a predetermined value "white_thresh1".

The reason why it is determined whether or not the number of white pixel lines is larger than the predetermined value "white_thresh1" is that a blank space between characters is detected to be a white pixel region if the pixel lines for detecting pixels are set in the direction vertical to the line image direction. If the value of "white_thresh1" is set so that the width of the white pixel region at this time is equal to or smaller than the predetermined threshold value "white_thresh1", the identification between a blank space between characters and a blank line between lines can be made.

If the number of white pixel lines "white_line" is larger than the predetermined value "white_thresh1", this white pixel region is determined to be a line space. The process then goes to step S2016. In this step, it is determined whether or not the number of black pixel lines "black_line" is larger than the lower limit of the number of black pixel lines "black_thresh1", and whether or not the number of black pixel lines "black_line" is smaller than the upper limit "black_thresh2".

If the number of white pixel lines is larger than the predetermined value and if the number of black pixel lines is within the predetermined range, that is, if the white pixel region with a width which is equal to or wider than the predetermined width equivalent to a line space is detected and if the black pixel region with the predetermined width, which is adjacent to the white pixel region, is detected ("YES" in step S2016), this black pixel region is extracted to be a line image (line) (step S2017).

Here, the reason that the number of black pixel lines, which is smaller than "black_thresh2", is set as a line image condition is as follows. If a document image includes a graphic, etc. and if a plurality of pixel lines including the graphic are detected as black pixel lines, the width of the graphic is normally wider than that of a line image. The number of black pixel lines therefore becomes larger than that of black pixel lines in a line image. Accordingly, by setting the upper limit of the number of black pixel lines, meaningless operations, such as the extraction of a black pixel region including a graphic, etc. as a line image, can be prevented from being performed.

Since one line image is detected as a result of the above described process, the line counter for counting the number of lines is incremented (step S2018), the value 0 is respectively assigned to the pixel line counters "white_line" and "black_line" so as to detect the next white or black pixel line (step S2019). Then, the process goes back to step S2007, and the above described process is repeated to detect the next white or black pixel region.

If the number of white pixel lines is determined to be equal to or smaller than the predetermined value "white_thresh1" ("NO" in step S2015), that is, if the white pixel region is not a line space, the detected black pixel region is not a line image. Therefore, the process goes to step S2019 where the line counters "white_line" and "black_line" are cleared.

Similarly, if the number of black pixel line is determined to be beyond the predetermined range ("NO" in step S2016), the black pixel region is determined not to be a line image. The process therefore goes to step S2019 where the pixel line counters "white_line" and "black_line" are cleared.

When it is determined that a line the pixels of which are yet to be determined is left in step S2007 during the repetition of the above described process ("NO" in step S2007), that is, when the detection of all the lines in one region partitioned in the vertical (or horizontal) direction is terminated, the process goes back to step S2002 where it is determined whether or not the process is completed for all the regions. If any region is left, the above described process is repeated.

According to the fourth preferred embodiment, respective document images which are partitioned and read are further partitioned into regions in a vertical and a horizontal direction, the numbers of line images in the regions which are partitioned in the vertical and the horizontal direction are obtained, and a region including a larger number of line images is used to detect a merging position by making the comparison between the numbers of line images. This is because line images which do not include a graphic, a table, etc. can be detected by partitioning the regions in the direction vertical to the lines. As a result, line images including characters can be accurately extracted from a document image even if the document image is written vertically or horizontally, or the document image includes a graphic, a table, etc.

Figure 22:
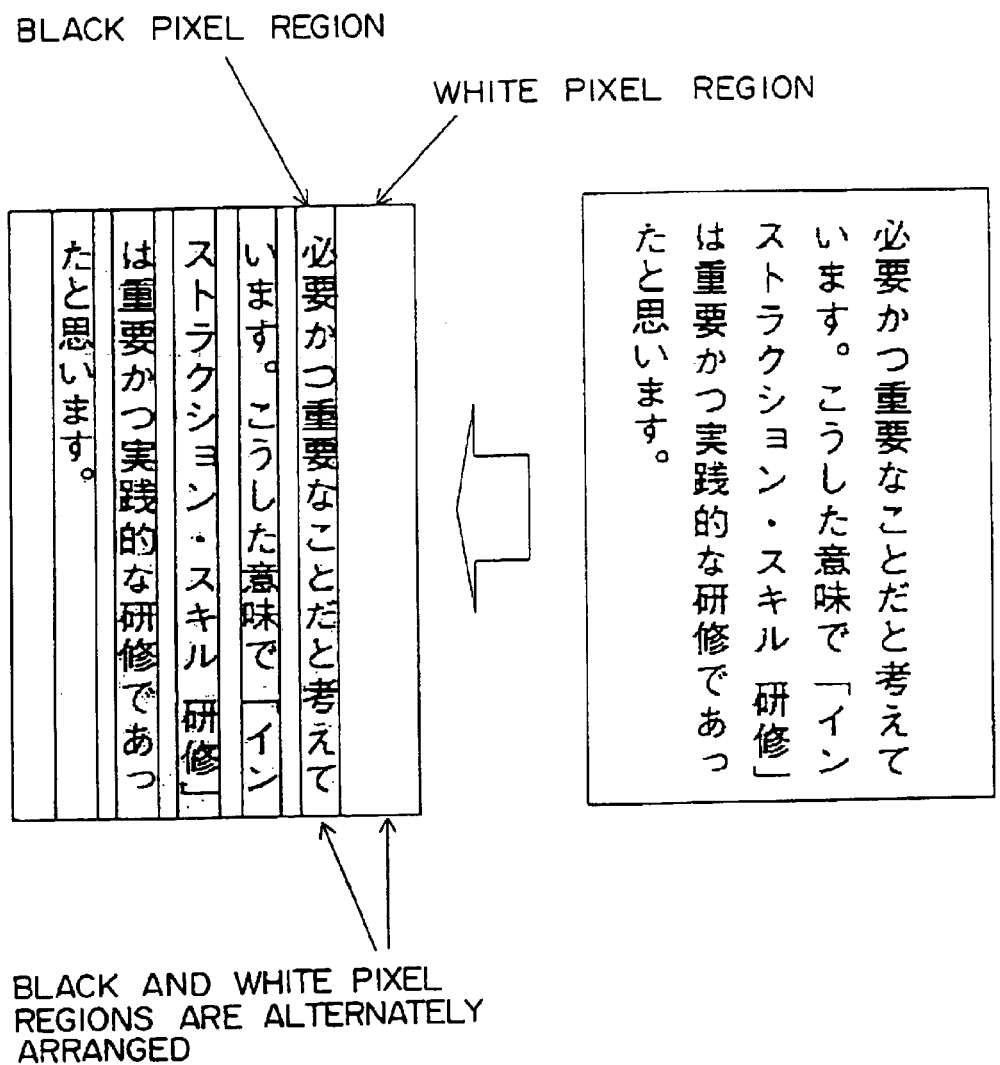
FIG. 22 explains the extraction of line images.

FIG. 22 explains the extraction of line images. Black or white pixel lines are detected one by one from the region of the document image shown on the right side of FIG. 22 in the vertical and the horizontal directions. Successive white and black pixel lines are respectively detected as a white and a black pixel region. Furthermore, if the number of black pixel lines satisfies the above described condition, a black pixel region composed of a predetermined number of black pixel lines is extracted as a line image. As a result, the line images shown on the left side of FIG. 22 can be extracted.

Figure 23:
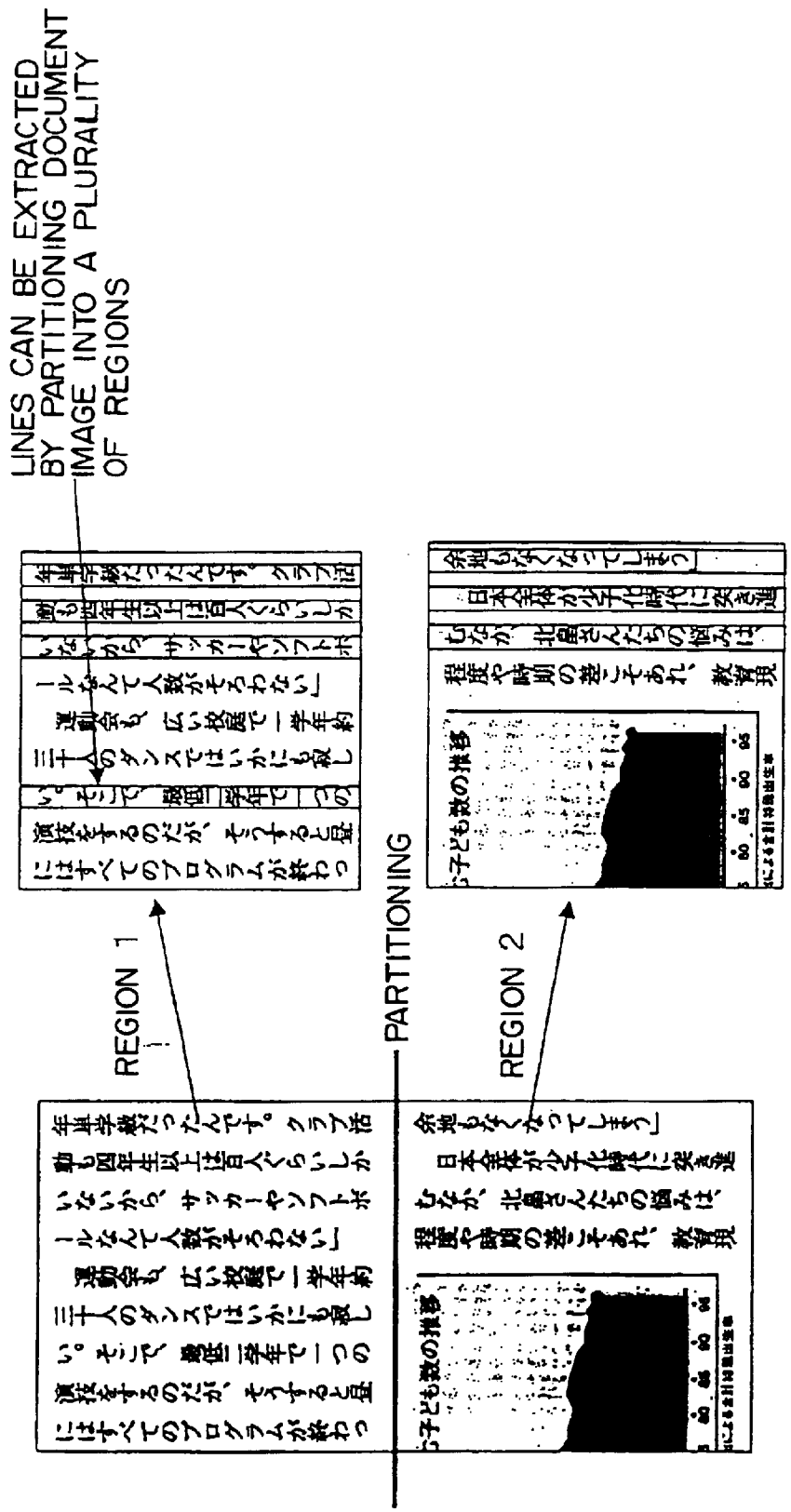
FIG. 23 explains the extraction of line images in a document including a graphic.

FIG. 23 explains the extraction of line images in a document including a graphic. Even if a document image includes a graphic, it is partitioned into two upper and lower regions in the direction vertical to line images, which are extracted from each of the regions, so that the black and the white pixel regions which do not include the graphic can be extracted from the upper region 1. Namely, if a document includes a graphic, line images can be extracted from an upper region 1 by partitioning the document into a plurality of regions.

Assume that the line images are extracted without partitioning the document into the plurality of regions. In this case, the blank line adjacent to the third line, in which includes part of a sentence 「そこで、最低二学年 で一つの」 is written, from the left of the region 1 shown in FIG. 23 includes the black pixels of the graphic in the lower portion. Accordingly, this blank line can be possibly detected not as a white but as a black pixel region. It was difficult to make a distinction between a blank line which originally includes no characters and a line image including characters.

According to the fourth preferred embodiment, even if document images include a graphic, a table, a ruled line, etc. the line images including only characters, from which the graphic, the table, the ruled line, etc. is removed, can be detected by respectively partitioning the document images which are partitioned and read into a plurality of regions, and by extracting the line images from each of the regions. Consequently, the line images can be compared by using the valid line images which can possibly be the position at which the document images are merged in the document image merging position detection process to be described later, thereby reducing a processing time taken to detect the merging position, and merging the document images more efficiently.

Explained next is the document image merging position detection process performed in step S1903 of FIG. 19, by referring to the flowchart shown in FIG. 24.

Figure 24:
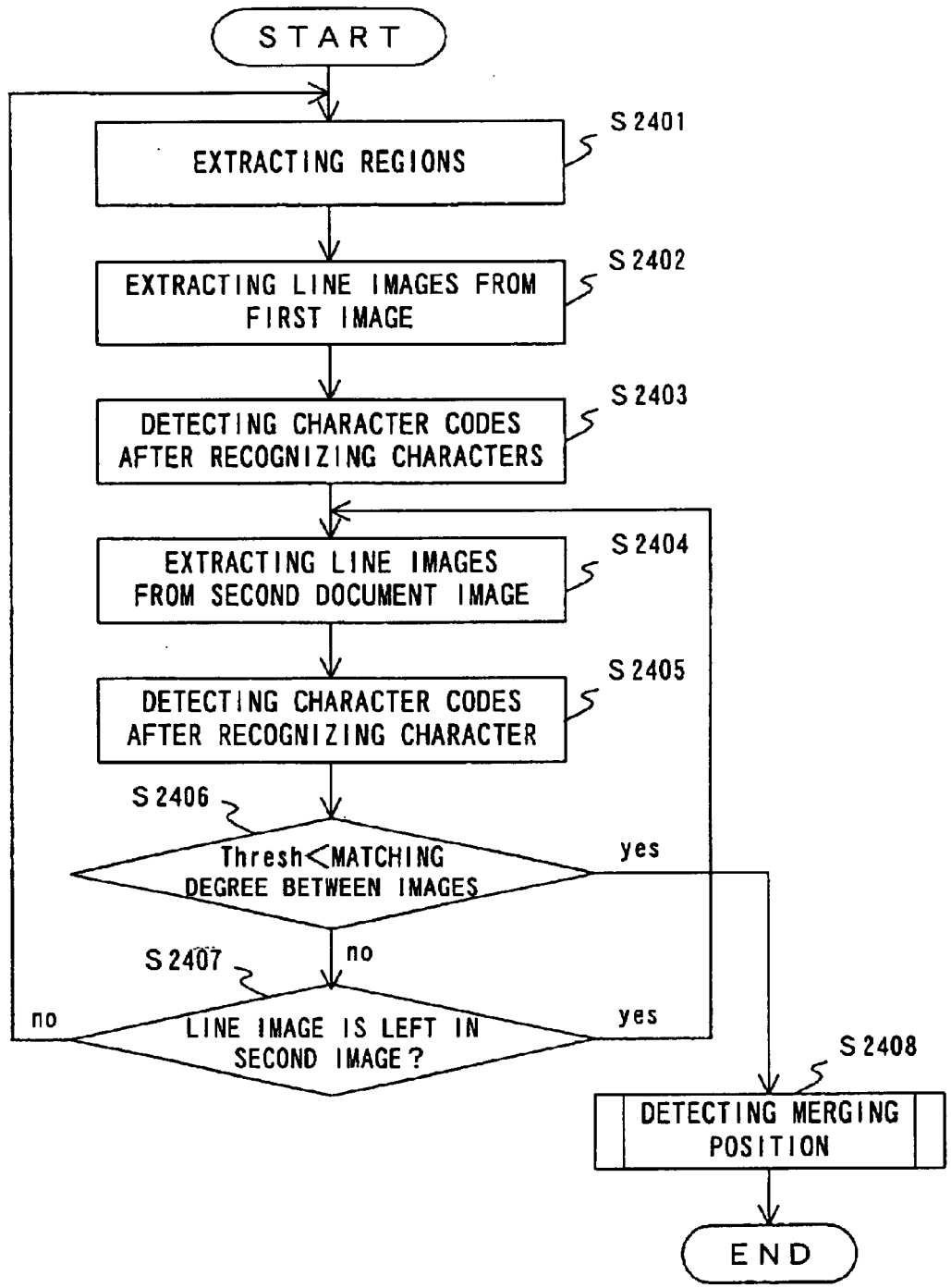
FIG. 24 is a flowchart showing the process for detecting a merging position of images.
Figure 25:
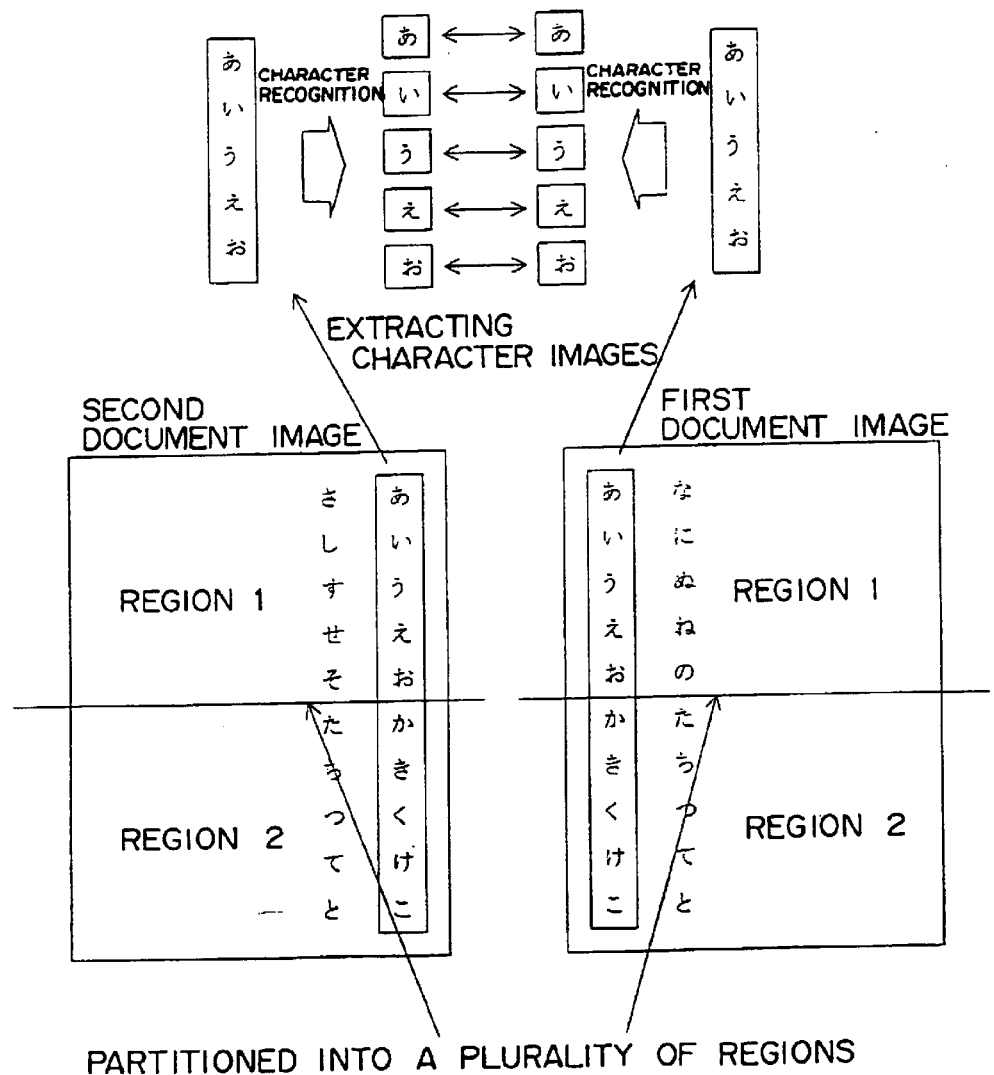
FIG. 25 explains the method for detecting an overlapping position when merging planes are parallel to lines.

Regions including large numbers of line images are extracted from the first and the second document storing units 12 and 13 with the above described line image extraction process (step S2401 of FIG. 24). At this time, corresponding regions in two document images are extracted as a first candidate. For example, when two document images are read and partitioned into upper and lower regions as shown in FIG. 25, the corresponding upper regions 1 are extracted. Because the document images are normally scanned in the same direction when being scanned by a hand-held scanner, a comparison is allowed to be made from the line images in the regions located at the corresponding positions in the first and the second document images.

Next, the line images in the region 1 in the first document image are extracted (step S2402). Note that the line images are sequentially extracted from the region 1 in the first document image in the direction from the edge toward the center. Then, the characters in the extracted line images are recognized, and the corresponding character codes are detected (step S2403).

The line images in the region 1 in the second document image are then extracted (step S2404). Next, the respective characters in the line images are recognized and the corresponding character codes are detected (step S2305). The character codes of the line images in the respective regions in the two document images are compared, and it is determined whether or not the matching degree between the character codes (between the line images) is larger than a predetermined value "Thresh" (step S2406). If the initial character codes do not match at this time, the character strings in the two regions can possibly get out of position. Therefore, it is determined whether or not the character codes match by comparing the initial character code in one region with each of the character codes in the other region.

If the matching degree between the character codes is equal to or smaller than the predetermined value ("NO" in step S2406), that is, if the matching degree between the character strings in certain line images in the first and the second document images is low, it is determined whether or not a line image whose character codes are yet to be compared is left in the selected region in the second document image (step S2407). If the line image whose character codes are yet to be compared is determined to be left, the process goes back to step S2404 where the next line image is extracted. Then, the above described process is repeated.

If a line image whose character codes are yet to be compared is determined not to be left in the selected region in the second document image in step S2407 ("NO" in step S2407), that is, if the matching degree between the character codes is equal to or smaller than the predetermined value when the comparison between the character codes of a particular line image (such as the first line image) in a selected region in the first document image and the character codes of all the line images in a selected region in the second document image is completed, the process goes back to step S2401 where the next regions in the first and the second document images are extracted. Then, the above described process is repeated.

When line images where the matching degree between character codes is larger than the predetermined value "Thresh" are detected, the process goes to step S2408 where the character regions in the line images with the high matching degree are detected as a document image merging position (overlapping position).

When a document is partitioned into a plurality of regions and scanned, there seems a certain tendency in a scanning order or direction depending on an individual. Therefore, character codes may be compared by respectively assigning numbers to line images, by storing a detection frequency of a line image which was previously detected as a merging position in correspondence with its number (identification information), and by giving precedence to the line image with a high detection frequency. By using the position of the line image, which was previously detected as a merging position, as a comparison target with high precedence as described above, the processing time for detecting a merging position can be reduced.

FIG. 25 explains the method for detecting an overlapping position when merging planes of two document images are parallel to line images, that is, when the document images are partitioned and scanned in the direction parallel to the lines.

The above described two partitioned document images are respectively partitioned into two regions, black and white pixel lines are detected in the direction vertical to the bar partitioning the regions, and a black pixel region where the number of black pixel lines is within a predetermined range are extracted as a line image. Next, the extracted line images of the first document image are extracted sequentially in a predetermined direction. By way of example, the line images are extracted sequentially in the direction from the edge to the center. Similarly, the extracted line images of the second document image are extracted sequentially in a predetermined direction.

Then, the characters in the extracted line images are recognized, and the matching degree between the character codes is determined by making the comparison between the obtained character codes. If the matching degree between the character codes is equal to or larger than a predetermined value, the corresponding character regions are determined to the position at which the two document images overlap.

In FIG. 25, all of the codes of five characters 「あ, い, う, え」 in the first line from the left of the region 1 in the first document image match the character codes of the five characters in the first line from the right of the region 1 in the second document image. Their positions are recognized to be the position at which the two document images are merged.

Figure 26:
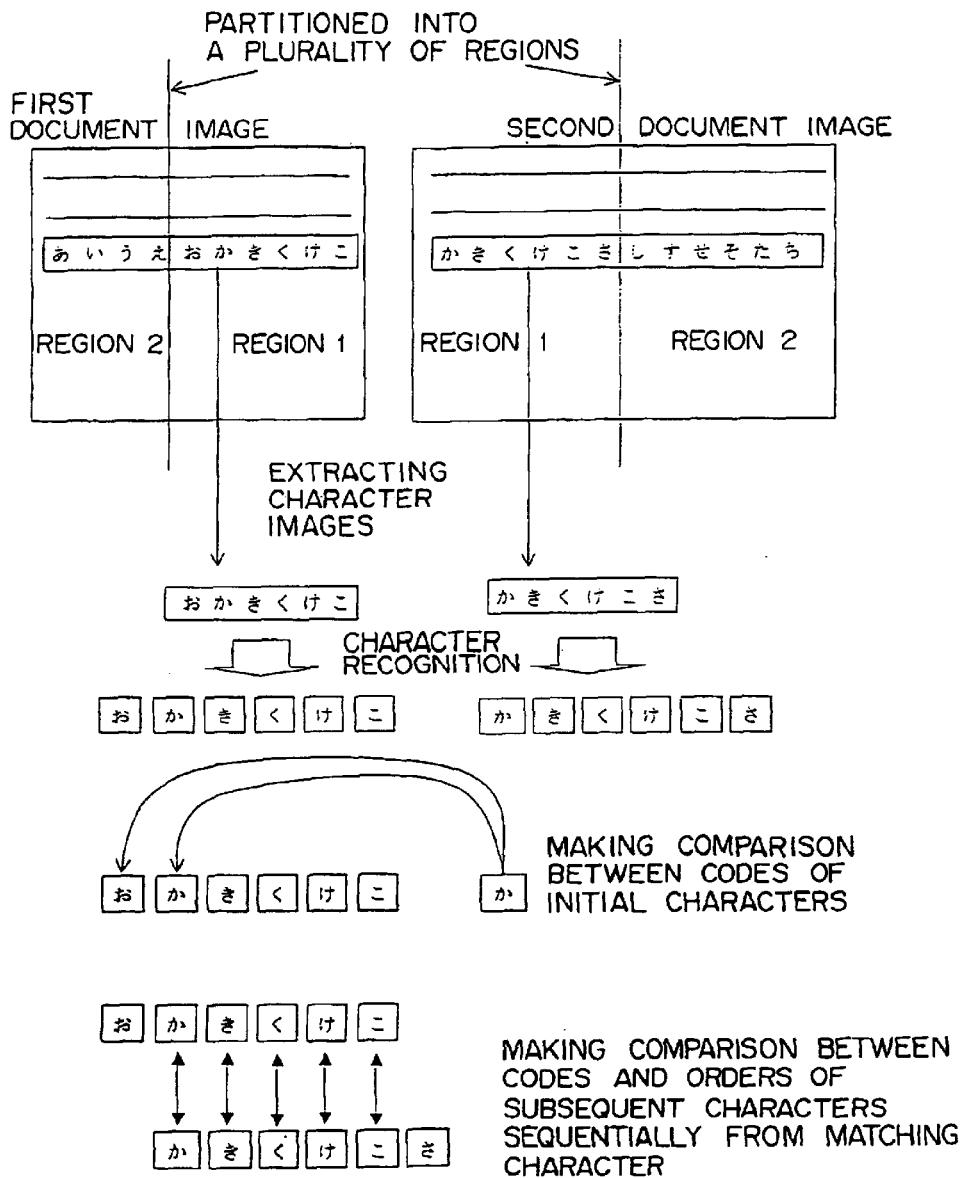
FIG. 26 explains the method for detecting an overlapping position when merging planes are vertical to lines.

FIG. 26 explains the method for detecting an overlapping position when merging planes of two document images are vertical to line images (lines), that is, when the document images are partitioned and scanned in the direction vertical to the lines.

Also in this case, the line images are extracted in the direction vertical to the bar partitioning the regions. After the line images are extracted, the respective characters are recognized. The matching degree between the character codes is then determined by making the comparison between the obtained character codes.

In FIG. 26, for example, the character codes in the third line from the top of the right region 1 in the first document image are compared with those in the third line from the top of the left region 1 in the second document image. In this case, after the horizontally written document is partitioned into the left and the right document images to overlap at the center and read, the respective partitioned images are further partitioned into the left and the right regions. However, the initial character in the third line in the region 1 in the first document image does not always match the initial character in the third line in the second document image depending on how to partition the document.

For example, in FIG. 26, the character string of the third line in the region 1 in the first document image is arranged in an order of 「お, か, き, く, け, こ」, while the character string of the third line in the region 1 in the second document image is arranged in an order of 「か, き, く, け, こ, さ」. These character strings do not perfectly match.

Therefore, according to this preferred embodiment, characters to be compared in a region in one document image are sequentially compared one by one based on the arrangement order of characters in a region in the other document image. If a matching character is found, the corresponding characters subsequent to that character are sequentially compared.

In the example shown in FIG. 26, the code of the first character か from the left of the region 1 in the second document image is sequentially compared with the codes of the first and the subsequent characters from the left of the region 1 in the first document image. When the code of the first character か matches the code of the second character from the left in the region 1 in the first document image, the code of the second character き from the left of the region 1 in the second document image is next compared with the code of the third character from the left of the region 1 in the first document image. Since all of the codes of the third and the subsequent characters match in this case, the positions of the character regions in the line image including the character string 「か, き, く, け, こ」 in the first document image and the line image including the same character string in the second document image are proved to be the position at which the two document images overlap, that is, a merging position.

Figure 27:
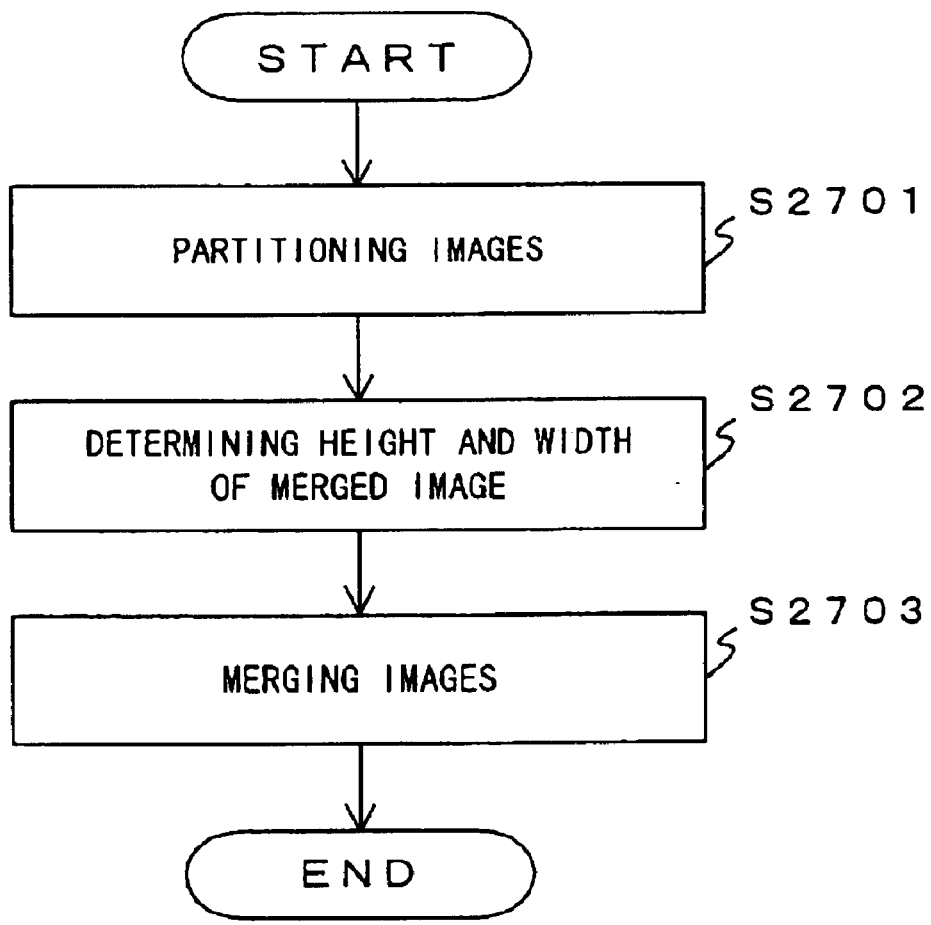
FIG. 27 is a flowchart showing the process for merging images.

When a document image merging position is detected in this way, the two document images are merged at the detected position. FIG. 27 is a flowchart showing the image merging process performed in step S1904 of FIG. 19.

When the document image merging position is obtained, the first and the second document images are partitioned into images necessary and unnecessary for merging the document images (step S2701 of FIG. 27). Because the two document images sometimes get out of position and are read, the height and the width of the region including the two document images are determined (step S2702). Then, the two document images, from which the unnecessary portions are removed, are merged.

Figure 28:
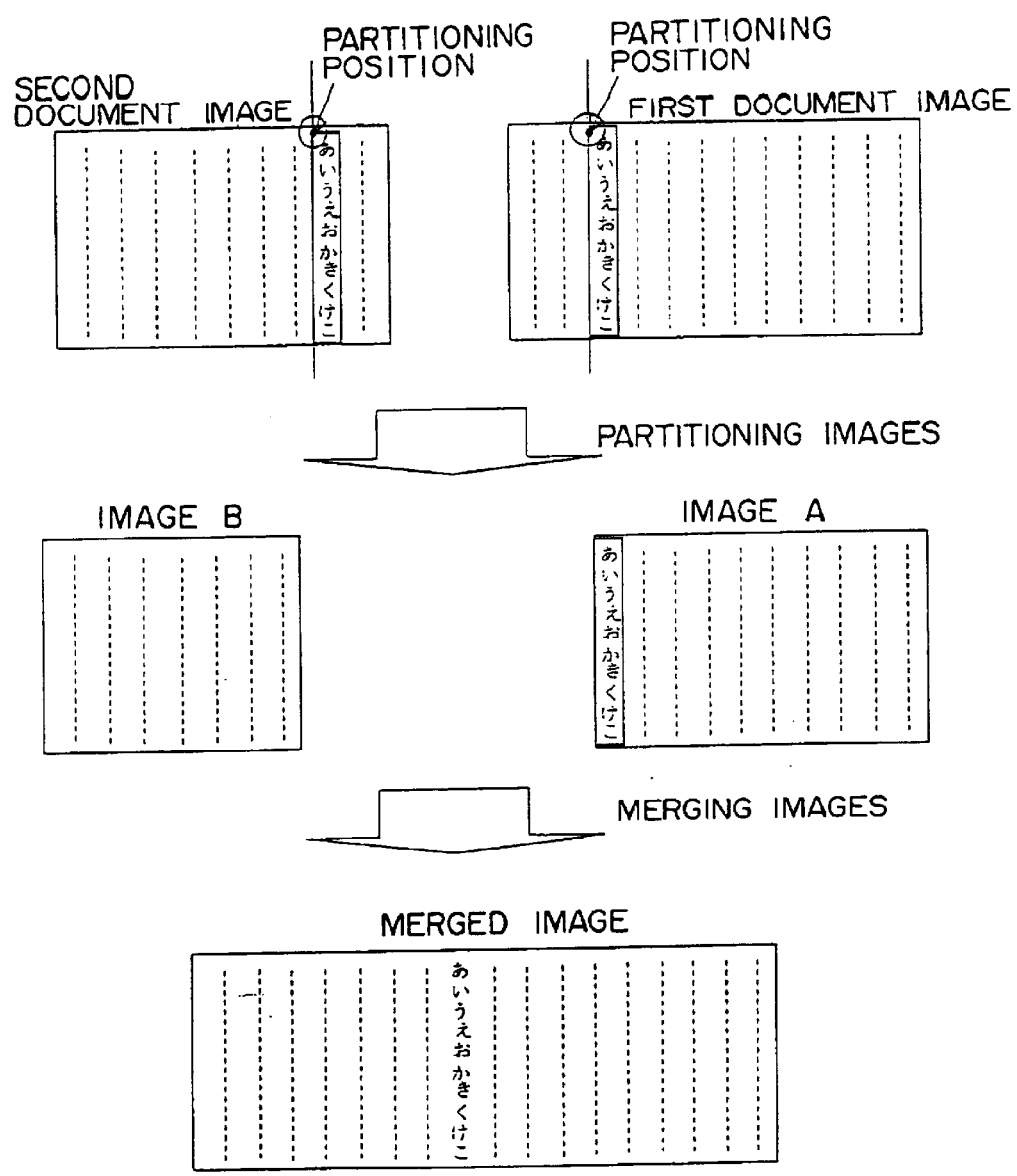
FIG. 28 explains the method for merging images when merging planes are parallel to lines.

FIG. 28 explains the method for merging document images when merging planes are parallel to lines, that is, when the document images are scanned in the direction parallel to the lines.

The line including a character string 「あ, い, う, . . .」 in the first document image and the line including the character string 「あ, い, う, . . .」 in the second document image are detected as a merging position, and the coordinates of the upper left corners of the corresponding lines in the first and the second documents are set as the coordinates of the merging position. Then, the first and the second document images are respectively partitioned into the regions on the right and the left sides of the coordinates at the merging position. A remaining image A from which the image on the left side of the partitioning position (merging position) of the first document image is removed and an image B from which the image on the right side of the merging position of the second document image is removed are merged, so that the original document image is regenerated.

Figure 29:
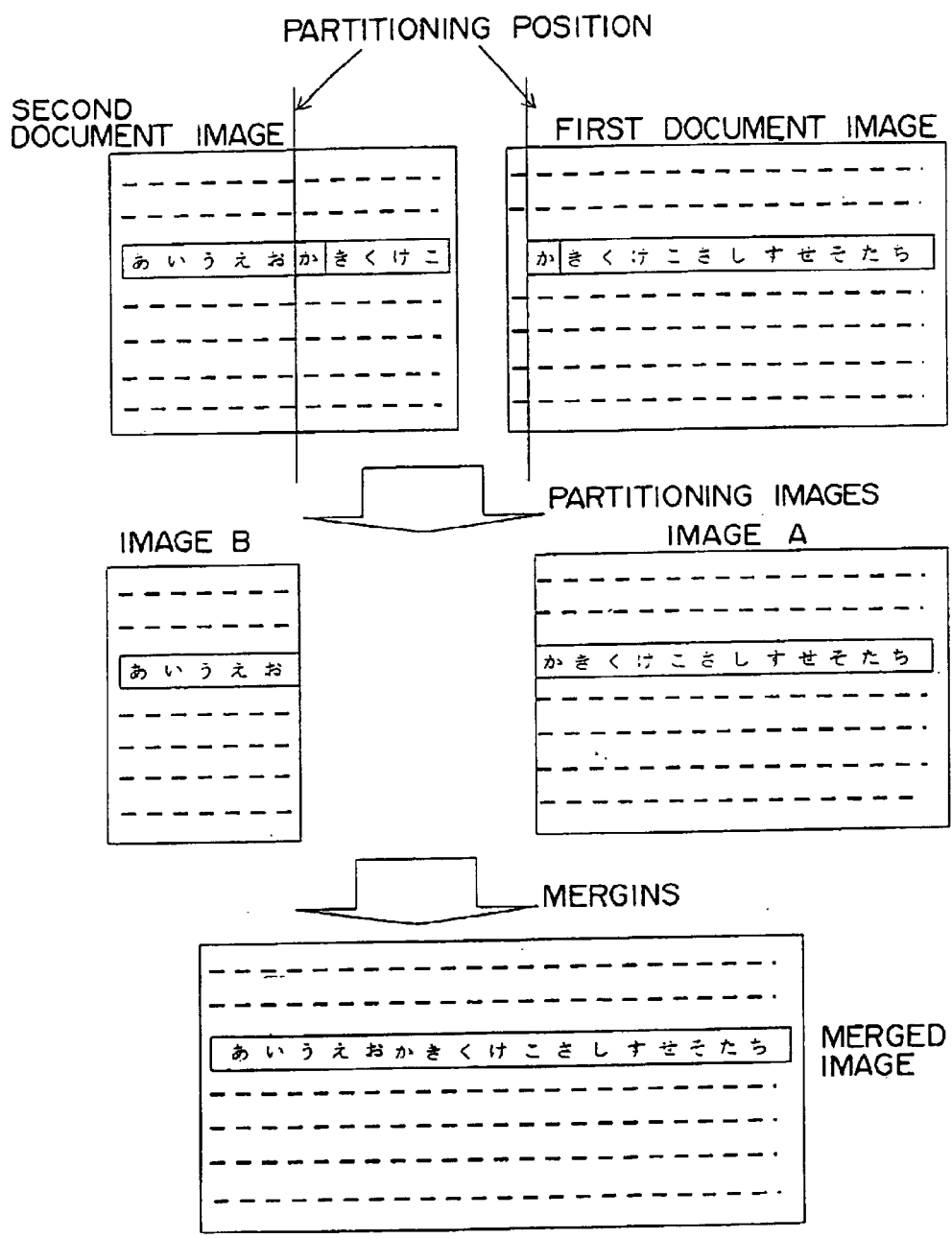
FIG. 29 explains the method for merging images when merging planes ares vertical to lines.

FIG. 29 explains the method for merging document images when merging planes are vertical to lines, that is, when the document images are scanned in the direction vertical to the lines.

In this case, the bar which passes through the upper left corner of the character 「い」, in the line being a character string 「え, . . .」 in the first document image and is orthogonal to the line, and the bar which passes through the upper left corner of the character 「い」 in the line being the character string 「え, . . .」 in the second document image and is orthogonal to the line are respectively obtained as partitioning positions. Then, a remaining image A from which the image at the left of the bar passing through the upper left corner of the character 「い」 in the first document image and a remaining image B from which the image on the left side of the bar passing through the upper left corner of the character 「き」 in the second document image are merged, so that the original document image is regenerated.

According to the above described fourth preferred embodiment, respective document images which are partitioned and read are further partitioned into a plurality of regions, and line images are extracted from the partitioned regions, so that the line images whose matching degrees are high are detected as a document image merging position as a result of the comparison between the character codes in the extracted line images. Therefore, even if a document includes a graphic, a table, a ruled line, etc., a black pixel region which does not include a graphic, a table, a ruled line, etc. can be extracted as a line image. For example, a black pixel region including a graphic, a table, etc. can be removed from line images by detecting a line image having a predetermined width, thereby extracting the line image more accurately. Accordingly, an original document image can be regenerated by allowing the document image merging position to be accurately detected in a short processing time.

In the above described fourth preferred embodiment, the document image merging position is detected by making the comparison between the codes of respective characters in extracted line images. However, the positions and the sizes of the character regions circumscribed to characters may be compared to detect a merging position.

Figure 30:
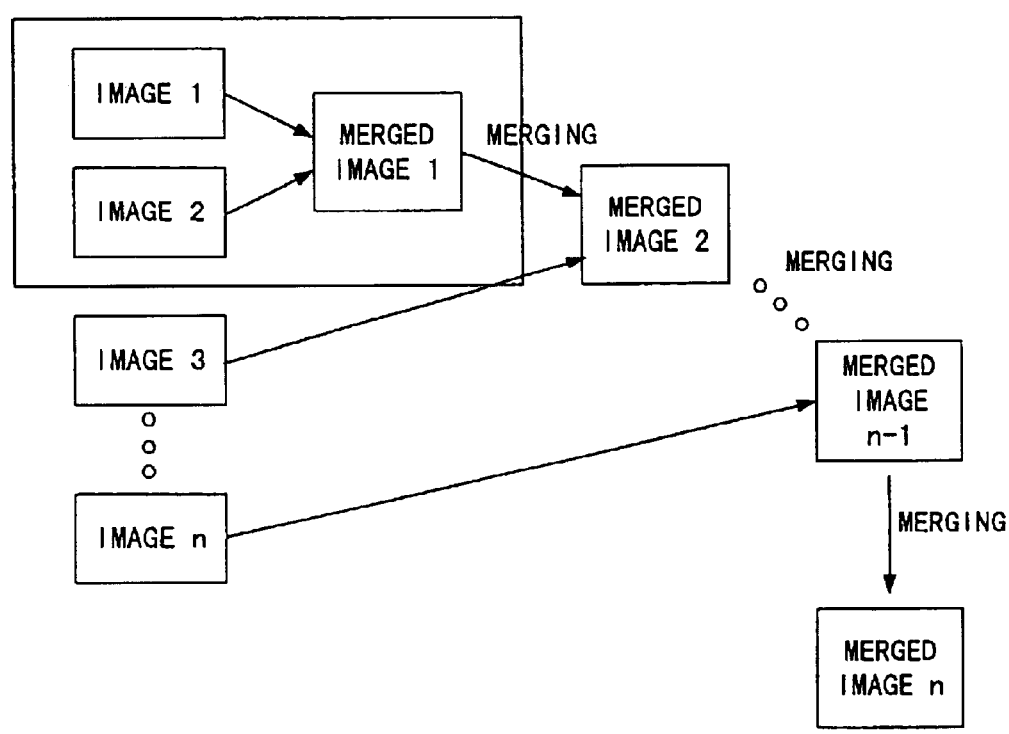
FIG. 30 explains the method for merging a plurality of images.

FIG. 30 explains the method for merging respective images when one document image is partitioned into three or more images and read.

As shown in FIG. 30, the position at which a firstly read image 1 and a secondly read image 2 are merged is obtained with the above described process for detecting a document image merging position, and the images 1 and 2 are merged at the obtained position. Next, the merged image 1 obtained by merging the first and second images 1 and 2 and a thirdly read image 3 are merged, so that a merged image 2 is obtained. Thereafter, an image obtained by merging images and a newly read image are sequentially merged, so that the original image is finally regenerated.

Figure 31:
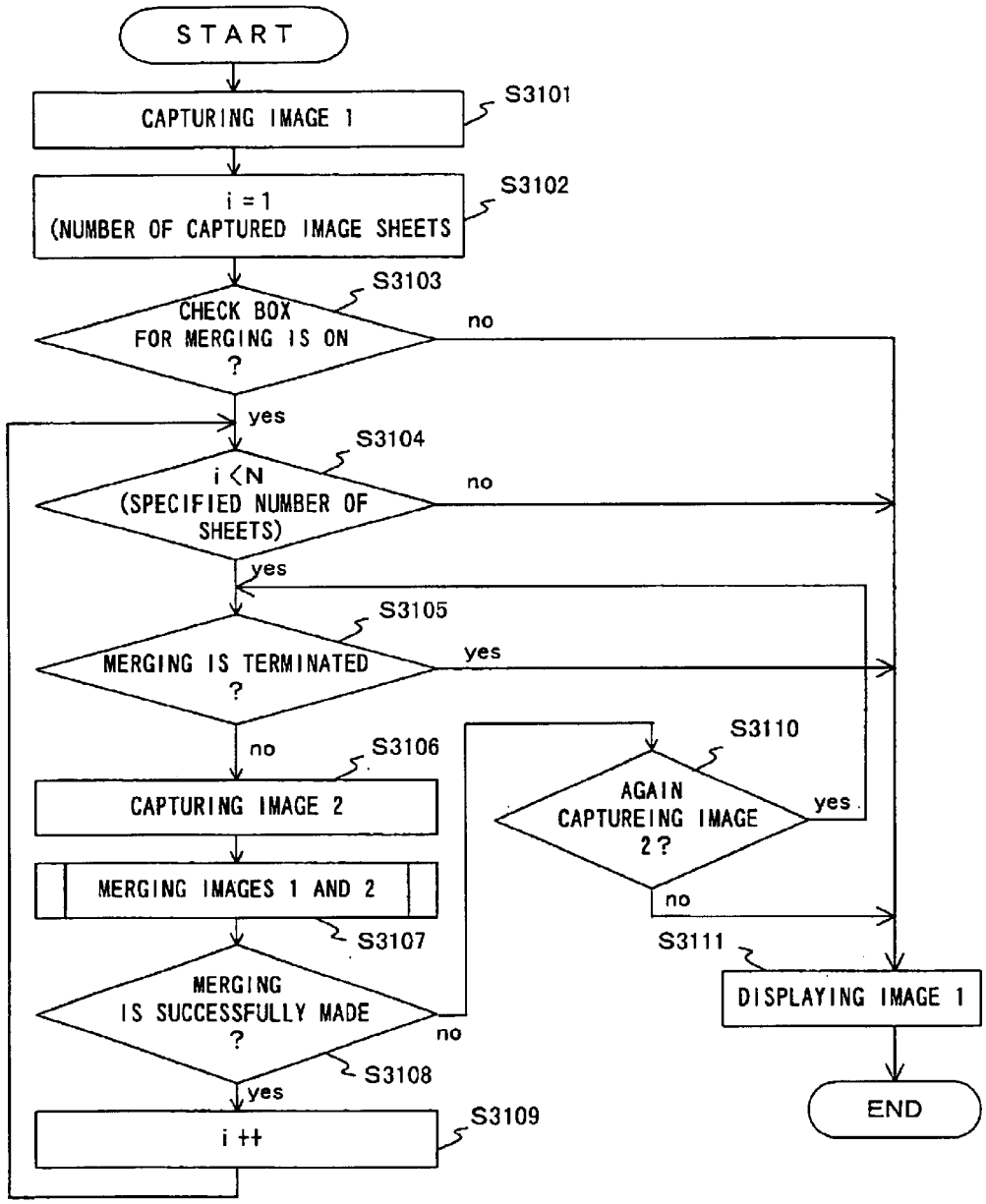
FIG. 31 is a flowchart showing the process for merging a plurality of images.
Figure 32:
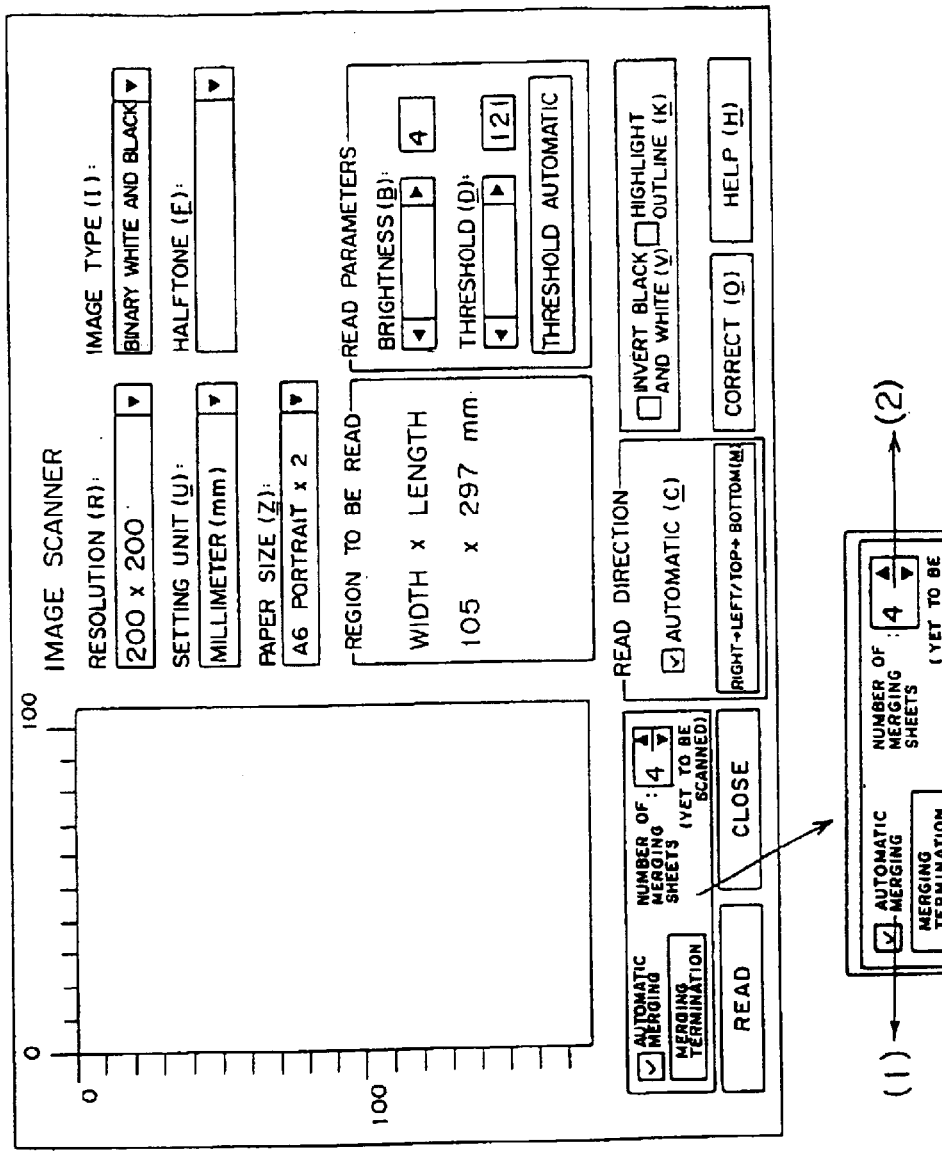
FIG. 32 explains a user interface.
Figure 34:
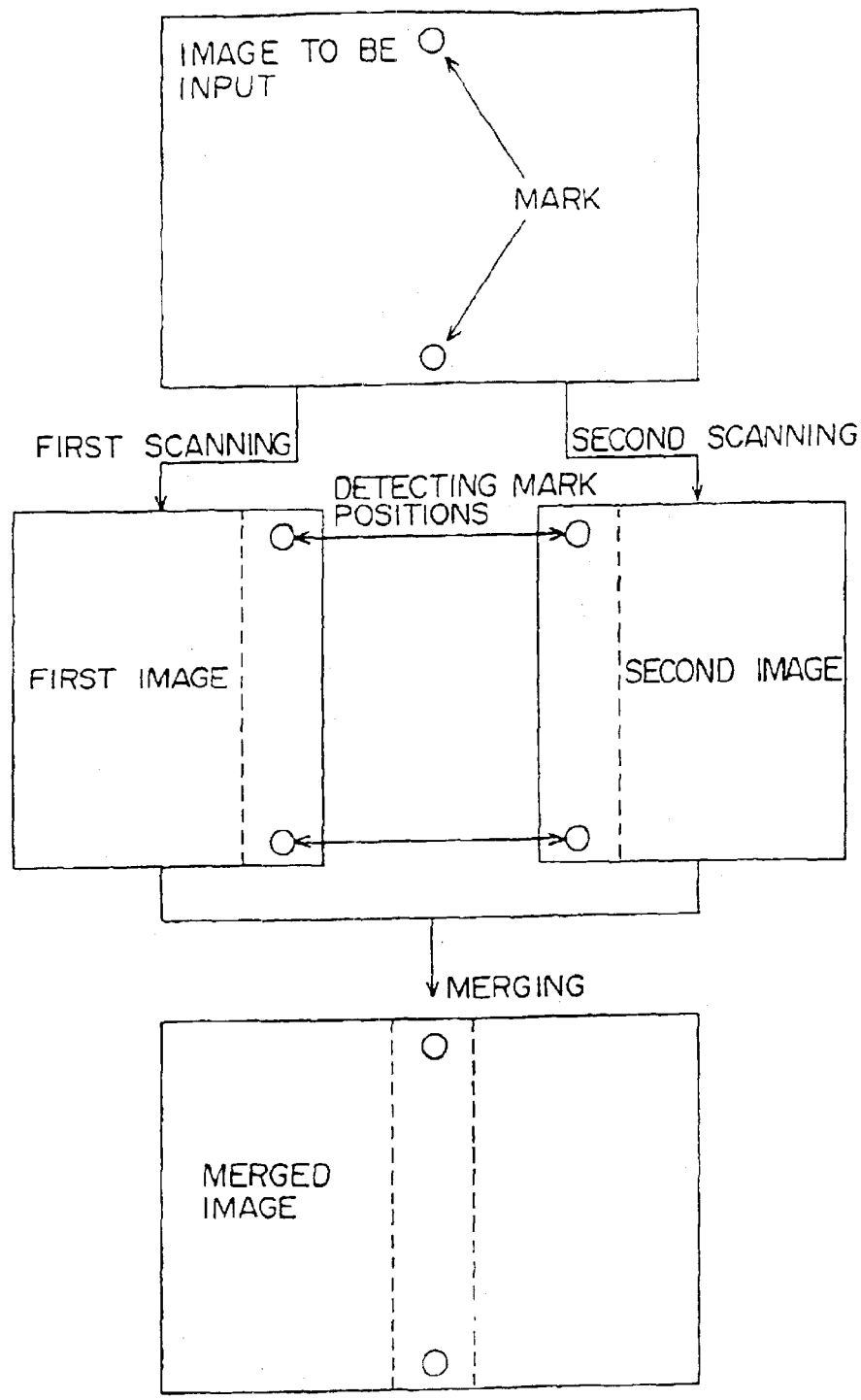
FIG. 34 explains a conventional method for merging images.

Explained next is the process for merging a plurality of images, by referring to the flowchart shown in FIG. 31 and the schematic explaining a user interface, which is shown in FIG. 32.

Initially, the image 1 stored in the first image storing unit 12 is captured (step S3101 of FIG. 31). Next, a value 1 is assigned to a counter "i" for counting the number of captured image sheets (step S3102).

Then, it is determined whether or not a check box for automatic merging is ON (step S3103). When a user turns on the check box for automatic merging in FIG. 32 (1) by clicking the check box with a mouse, etc., the determination results in "YES" in step S3103. The process in and after step S3104 is therefore performed to merge partitioned document images. If the check box for automatic merging is determined to be OFF ("NO" in step S3103), the process goes to step S3111 where captured images are displayed unchanged. Note that the automatic merging is enabled in the initial condition setting.

Next, it is determined whether or not the value of the counter "i" for counting the number of captured image sheets is smaller than the number of merging sheets "n" set by a user (step S3104).

The number of merging sheets indicates the number of pieces into which one document image is partitioned and read. A user is allowed to set the number of merging sheets by changing the number in (2) of FIG. 32.

A display device of the document image processing device according to this preferred embodiment displays a setting screen shown in FIG. 32. A user can set reading and merging conditions, etc. for a document image on the setting screen. To be more specific, the resolution of a scanner, an image reading unit, the size of paper to be read, an image type, etc. can be selected from a pull-down menu. Furthermore, a reading direction and whether or not to enable automatic merging can be changed by clicking the corresponding check boxes with a mouse, etc. In this way, the processing conditions from when a document image is read till when partitioned document images are merged can be easily set, thereby simplifying the operations for merging document images.

Turning back to FIG. 31. If the number of captured image sheets is smaller than a specified number of merging sheets ("YES" in step S3104), it is then determined whether or not a merging termination button is pressed. The merging termination button is a button shown in (3) of FIG. 32. Pressing this button during automatic merging can terminate the automatic merging process.

If the merging termination button is not pressed ("NO" in step S3105), the process goes to step S3106 where the image 2 stored in the second image storing unit 13 is captured (step S3106). The two images are merged at the obtained merging position with the above described process for detecting a merging position (step S3107). Then, it is determined whether or not the image merging is successfully performed (step S3108).

Since the firstly and the secondly read images are captured as the images 1 and 2 at the start of the process, both of them are merged and the merged image is stored in the first image storing unit 12.

When the image merging is successfully performed ("YES" in step S3108), the merging of the first and the second images is already terminated at the start of the process. Therefore, the value of the counter "i" is incremented to 2, the state where the merging of the two image sheets is terminated is stored, and the merged image is transferred to the first image storing unit 12 (step S3109). The process then goes back to step S3104. Thereafter, the third and the subsequent images are sequentially stored in the second image storing unit 13. By repeatedly merging the image 2 and the second and the subsequent merged images, the original document image which is partitioned and read is regenerated.

If the image merging is determined to be unsuccessfully performed ("NO" in step S3108), the process goes to step S3110 where it is determined whether or not the image 2 in the second image storing unit 13 is again captured. When a user instructs image capturing, the process goes back to step S3105 where the above described image merging process is repeated.

Additionally, if the merging termination button is determined to be pressed in step S3110, the process goes to step S3111 where the merged image stored in the first image storing unit 12 is displayed.

If the value of the counter "i" is determined to be equal to or larger than the specified number of merging sheets "N" ("NO" in step S3104), that is, when the image merging process is terminated for the specified number of sheets, the process goes to step S3111 where the merged image stored in the first image storing unit 12, that is, the regenerated original document image is displayed.

In the above described process, when one document image is partitioned into "n" images and read as shown in FIG. 30, the merged image 1 is generated by merging the first and the second images 1 and 2, and next, the merged image 2 is generated by merging the third image 3 and the merged image 1. Thereafter, the final merged image "n" is generated by merging a merged image "K−1" obtained in the previous merging process and the next image "K" in a similar manner.

As described above, when one document image is partitioned into a plurality of images and read, the partitioned images are not individually merged. That is, the merged image obtained by merging the first and the second images is merged with the third image, the resultant merged image is further merged with the fourth image, and a similar merging process is repeated, so that a merging position can be detected in a shorter time without detecting a useless image merging position, for example, if an image scanning order has certain regularity.

If a document image is partitioned into three or more images, the order of scanning the document image by a hand-held scanner, etc. has a certain tendency in many cases. Therefore, when the merging direction of the images 1 and 2 is detected, the merging position with the third image 3 is detected in the detected direction to which precedence is given, so that the merging position can be detected in a shorter time. Additionally, if the merging direction is changed during the image merging process, a merging position can be efficiently detected according to a changed in a scanning order and direction by merging the next image in the newly detected merging direction.

Furthermore, program and data stored in the document image processing device according to the present invention may be stored onto a storage medium 3301 such as a floppy disk, a CD-ROM, etc. shown in FIG. 33. The storage medium 3301 is read with a medium driving device such as a floppy disk driver, a CD-ROM driver, etc., and the read program and data are stored in a storage device 3303 such as a hard disk, etc., so that the program may be executed. Or, the program is stored in a storage device 3304 such as a hard disk of an information provider computer, etc., transferred to the user information processing device 3302 with a communication, and stored in the user side storage device 3303, so that the program may be executed. Besides, the program stored onto the storage medium 3301 may partially have the capabilities of the flowcharts referred to in the preferred embodiments.

According to the present invention, there is no need to put marks for merging documents which are partitioned and read, an operator no longer need to specify the position at which the partitioned document images are merged, and the plurality of images can be automatically merged without imposing any workload on a user. Furthermore, respective document images which are partitioned and read are further partitioned into a plurality of regions, and line images are extracted from the regions, so that the plurality of document images can be accurately merged with line image extraction even if the original document image includes a graphic, a table, etc.

What is claimed is:

1. A document image processing device, comprising:
character region extracted unit extracting character regions respectively from a plurality of document images which are partitioned and read;
overlapping detecting unit detecting character regions whose matching degrees are high by making a comparison between positions and sizes of the respective charcter regions extracted by said character region region extracting unit, and detecting an overlapping of the plurality of document images based on positions of the detected character regions whose matching degrees are high; and
image merging unit merging the plurality of document images at an overlapping position detected by said overlapping detecting unit, wherein said overlapping detecting unit detects an overlapping position sequentially from a direction with a higher priority among a plurality of detection directions.

2. The document image processing device according to claim 1,
wherein said overlapping detecting unit determines an overlapping position detection direction depending on whether or not the document images are written either vertically or horizontally.

3. A document image processing device comprising:
region partitioning unit partitioning first and second document images which are partitioned and read, respectively into a plurality of vertical and horizontal regions;
line image extracting unit extracting line images containing only character images from the plurality of vertical and horizontal regions partitioned by said region partitioning unit;
region judging unit comparing between the number of line images containing only character images in the plurality of regions vertically partitioned and the number of such line images found in the plurality of regions horizontally partitioned, and judging the plurality of regions that hold more line images found to contain only character images as a low graphics-ratio region;
overlapping detecting unit detecting an overlapping position between the first and second document images, based on positions of character regions whose matching degrees are high by making a comparison between a character region of a line image in a region judged as a low graphics-ratio region by region judging unit and a character region of a line image in a corresponding region of the second document image; and
image merging unit merging first and second document images at the overlapping position detected by said overlapping detecting unit.

4. The document image processing device according to claim 3,
wherein:
said region partitioning unit partitions the plurality of document images into a plurality of regions in a vertical and a horizontal direction; and
said line image extracting unit makes a comparison between the number of line images extracted from a region partitioned in the vertical direction in the plurality of document images and the number of line images extracted from a region partitioned in the horizontal direction, and recognizes a line image direction of a region including a larger number of line images as a line image direction of the plurality of document images.

5. The document image processing device according to claim 4,
wherein said overlapping detecting unit detects character regions whose matching degrees are high as an overlapping position by making a comparison between character regions in the line images in the plurality of partitioned region in the direction of the larger number of line images, which are extracted by said line image extracting unit.

6. The document image processing device according to claim 3,
wherein said line image extracting unit detects pixels for one pixel line in a partitioned region, and detects pixel lines including a predetermined or larger number of black pixels as black pixel lines, and other lines as white pixel lines.

7. The document image processing device according to claim 6, wherein said line image extracting unit detects pixels in the partitioned regions in line units in a direction vertical to a partitioning bar of the regions partitioned by said region partitioned unit.

8. The document image processing device according to claim 6, wherein said line image extracts as a black pixel region a region where the number of successive black pixel lines is within a predetermined range.

9. The document image processing device according to claim 8, wherein said line image extracting unit extracts as a white pixel region a region where the number of successive white pixel lines is equal to or larger than a predetermined value.

10. The document image processing device according to claim 8,
wherein said line image extracting unit changes the number of black pixel lines regarded as black pixel regions depending on a resolution of a read document image.

11. The document image processing device according to claim 8,
wherein said line image extracting unit extracts a black pixel region adjacent a white pixel region satisfying a predetermined condition an as a line image.

12. The document image processing device according to claim 3,
wherein said region partitioning unit changes a partitioned region size depending on a resolution of a read document image.

13. The document image processing device according to claim 3,
wherein said overlapping detecting unit stores a detection frequency of a line image which was previously detected as an overlapping position of a document image in correspondence with identification information assigned to the line image, and detects an overlapping position by giving precedence to a line image with a high detection frequency.

14. The document image processing device according to claim 3, wherein said overlapping detecting unit makes a comparison between the line images in the respective regions in a predetermined order.

15. A document image processing device, comprising:
region partitioning unit partitioning first and second document images which are partitioned and read, respectively into a plurality of vertical and horizontal regions;
line image extracting unit extracting line images containing only character images from the plurality of vertical and horizontal regions partitioned by said region partitioning unit;
region judging unit comparing between the number of line images containing only character images in the plurality of regions vertically partitioned and the number of such line images found in the plurality of regions horizontally partitioned, and judging the plurality of regions that hold more line images found to contain only character images as a low graphics-ratio region;
character recognizing unit recognizing character images in the line images in the region judged as a low graphics-ratio region by the region judging unit;
overlapping detecting unit detecting an overlapping position between the first and second document images, based on a character recognition result of the low graphics ratio region in the first document, and a character recognition result of a corresponding region in the second document; and
image merging unit merging the first and second document images at an overlapping position detected by said overlapping detecting unit.

16. A document image merging method, comprising:
partitioning first and second document images from among a plurality of document images which are partitioned and read, respectively into a plurality of vertical and horizontal regions;
extracting line images containing only character images from the plurality of vertical and horizontal regions partitioned;
comparing between the number of line images containing only character images in the plurality of regions vertically partitioned and the number of such line images found in the plurality of regions horizontally partitioned, and judging the plurality of regions that hold more line images found to contain only character images as a low graphics-ratio region;
detecting an overlapping position between the first and second document images, based on positions of character regions whose matching degrees are high by making a comparison between a character region of a line image in a region judged as the low graphics-ratio region and a character region of a line image in a corresponding region of the second document image; and
merging the first and second document images at the detected overlapping position.

17. A document image merging method, comprising:
partitioning first and second document images among a plurality of document images which are partitioned and read, respectively into a plurality of vertical and horizontal regions;
extracting line images containing only character images from the plurality of vertical and horizontal regions partitioned;
comparing between the number of line images containing only character images in the plurality of regions vertically partitioned and the number of such line images found in the plurality of regions horizontally partitioned, and judging the plurality of regions that hold more line images found to contain only character images as a low graphics-ratio region;
recognizing character images in character regions in the line images in the low graphics-ratio region;
detecting an overlapping position between the first and second document images, based on character recognition results of the low graphics-ratio region and a character recognition result of a corresponding region in the second document image; and
merging the first and second document images at the detected overlapping position.

18. A document image merging method, comprising:
partitioning first and second document images among a plurality of document images which are partitioned and read, respectively into a plurality of vertical and horizontal regions;
extracting line images containing only character images from the plurality of vertical and horizontal regions partitioned;
comparing between the number of line images containing only character images in the plurality of regions vertically partitioned and the number of such line images found in the plurality of regions horizontally partitioned, and judging the plurality of regions that hold more line images found to contain only character images as a low graphics-ratio region;

detecting an overlapping position between the first and second document images based on positions of the extracted line image whose matching degrees are high by making a comparison between a character region of a line image in a region judged as the low graphics-ratio region and a character region of a line image in a corresponding region of the second document image; and merging the first and second document images at the detected overlapping position.

19. A document image merging method, comprising:

making a display to allow a setting of whether or not to automatically merge a plurality of document images which are partitioned and read on a display screen;

partitioning first and second document images among the plurality of document images among the plurality of document images which are partitioned and read, respectively into a plurality of vertical and horizontal regions;

extracting line images containing only line character images from the plurality of vertical and horizontal regions partitioned;

comparing between the number of line images containing only character images in the plurality of regions vertically partitioned and the number of such line images found in the plurality of regions horizontally partitioned, and judging the plurality of regions that hold more line images found to contain only character images as a low graphics-ratio region;

recognizing character images in character regions within the extracted line images;

detecting ah overlapping position of the first and second document images, based on positions of character regions whose matching degrees are high by making a comparison between character region of a line image in the low graphics-ratio region and a region of a line image in a corresponding region of the second document image.

20. A computer-readable storage medium on which is recorded a program for causing a computer to execute a document image merging process, said process comprising:

partitioning first and second document images among a plurality of document images which are partitioned and read, respectively into a plurality of vertical and horizontal regions;

extracting line images containing only character images from the plurality of vertical and horizontal regions partitioned;

comparing between the number of line images containing only character images in the plurality of regions vertically partitioned and the number of such line images found in the plurality of regions horizontally partitioned, and judging the plurality of regions that hold more line images found to contain only character images as a low graphics-ratio region;

detecting an overlapping position between the first and second document images based on positions of character regions whose matching degrees are high by making a comparison between a character region of a line image in the low graphics-ratio region and a character region of a line image in a corresponding region of the second document image; and merging the first and second document images at the detected overlapping position.

21. A computer-readable storage medium on which is recorded a program for causing a computer to execute a document image merging process, said process comprising:

partitioning first and second document images among a plurality of document images which are partitioned and read, respectively into a plurality of vertical and horizontal regions;

extracting line images containing only character images from the plurality of vertical and horizontal regions partitioned;

comparing between the number of line images containing only character images in the plurality of regions vertically partitioned and the number of such line images found in the plurality of regions horizontally partitioned, and judging the plurality of regions that hold more line images found to contain only character images as a low graphics-ratio region;

recognizing character images within character regions in the line images in the regions judged as a low graphics-ratio region;

detecting an overlapping position between the first and second document images based on a character recognition result of the low graphics-ratio region and a character recognition result of a corresponding region in the second document image; and merging the first and second document images at the detected overlapping position.

22. A computer-readable storage medium on which is recorded a program for causing a computer to execute a document image merging process, said process comprising:

making a display to allow a setting of whether or not to automatically merge a plurality of document images which are partitioned and read on a display screen;

partitioning first and second document images among the plurality of document images, respectively into a plurality of vertical and horizontal regions;

extracting line images containing only characters images respectively from the plurality of vertical and horizontal regions partitioned;

recognizing character images in character regions within the extracted line images;

comparing between the number of line images containing only character images in the plurality of regions vertically partitioned and the number of such line images found in the plurality of regions horizontally partitioned, and judging the plurality of regions that hold more line images found to contain only character images as a low graphics-ratio region;

detecting an overlapping position between the first and second document images based on positions of character regions whose matching degrees are high by making a comparison between a character region of a line image in the region judged as a low graphics-ratio region and a character region of a line image in a corresponding region of the second document image; and merging the first and second document images at the detected overlapping position.

* * * * *